(12) United States Patent
Dohmen et al.

(10) Patent No.: US 12,465,568 B2
(45) Date of Patent: Nov. 11, 2025

(54) CRYOPROTECTIVE AGENTS FOR PARTICULATE FORMULATIONS

(71) Applicant: ethris GmbH, Planegg (DE)

(72) Inventors: Christian Dohmen, Munich (DE); Philipp Beck, Munich (DE)

(73) Assignee: ethris GmbH, Planegg (DE)

( * ) Notice: Subject to any disclaimer, the term of this patent is extended or adjusted under 35 U.S.C. 154(b) by 0 days.

(21) Appl. No.: 17/050,440

(22) PCT Filed: Apr. 25, 2019

(86) PCT No.: PCT/EP2019/060646
§ 371 (c)(1),
(2) Date: Oct. 24, 2020

(87) PCT Pub. No.: WO2019/207061
PCT Pub. Date: Oct. 31, 2019

(65) Prior Publication Data
US 2021/0137846 A1 May 13, 2021

(30) Foreign Application Priority Data

Apr. 25, 2018 (EP) .................................. 18169325
Aug. 14, 2018 (EP) .................................. 18189010

(51) Int. Cl.
| | | |
|---|---|---|
| A61K 9/1272 | (2025.01) | |
| A61K 9/00 | (2006.01) | |
| A61K 9/16 | (2006.01) | |
| A61K 9/51 | (2006.01) | |
| A61K 31/7105 | (2006.01) | |
| A61K 47/10 | (2017.01) | |
| A61K 47/54 | (2017.01) | |
| A61K 47/59 | (2017.01) | |
| A61K 48/00 | (2006.01) | |

(52) U.S. Cl.
CPC .......... *A61K 9/1272* (2013.01); *A61K 9/0043* (2013.01); *A61K 9/0073* (2013.01); *A61K 9/1617* (2013.01); *A61K 9/1688* (2013.01); *A61K 9/5123* (2013.01); *A61K 9/5192* (2013.01); *A61K 31/7105* (2013.01); *A61K 47/10* (2013.01); *A61K 47/549* (2017.08); *A61K 47/59* (2017.08); *A61K 48/0033* (2013.01); *A61K 48/0041* (2013.01)

(58) Field of Classification Search
CPC .. A61K 9/1617; A61K 9/1688; A61K 9/5123; A61K 9/5192; A61K 31/7105; A61K 47/10; A61K 47/549; A61K 48/0041
See application file for complete search history.

(56) References Cited

U.S. PATENT DOCUMENTS

| | | | |
|---|---|---|---|
| 5,783,565 A | 7/1998 | Lee et al. | |
| 2013/0142879 A1* | 6/2013 | Lewis ................... | A61K 31/00 424/490 |
| 2013/0156849 A1 | 6/2013 | de Fougerolles et al. | |
| 2013/0338210 A1* | 12/2013 | Manoharan ........... | C07C 323/25 549/341 |
| 2014/0242690 A1 | 8/2014 | Alton et al. | |
| 2014/0328897 A1 | 11/2014 | Irming | |
| 2017/0056526 A1 | 3/2017 | Dohmen et al. | |
| 2017/0267631 A1* | 9/2017 | Payne ................... | C07C 323/52 |
| 2018/0000953 A1* | 1/2018 | Almarsson ........... | A61K 31/685 |
| 2021/0137840 A1* | 5/2021 | Dohmen ............ | A61K 48/0041 |
| 2021/0137846 A1 | 5/2021 | Dohmen et al. | |
| 2021/0316008 A1 | 10/2021 | Dohmen et al. | |

FOREIGN PATENT DOCUMENTS

| | | |
|---|---|---|
| CN | 1515246 A | 7/2004 |
| CN | 103687588 A | 3/2014 |
| EP | 1 954 252 A2 | 8/2008 |
| WO | WO 96/34109 A1 | 10/1996 |
| WO | WO 2005/121369 A2 | 12/2005 |
| WO | 2008/131129 A2 | 10/2008 |
| WO | WO 2015128030 * | 9/2015 |
| WO | WO 2016118724 A1 * | 7/2016 |
| WO | WO 2018/010815 A1 | 1/2018 |
| WO | 2018089801 A1 | 5/2018 |
| WO | WO 2018/089540 A1 | 5/2018 |
| WO | 2020/0035460 A1 | 2/2020 |

OTHER PUBLICATIONS

Farley, Christopher, and Douglas H. Juers. "Efficient cryoprotection of macromolecular crystals using vapor diffusion of volatile alcohols." *Journal of structural biology* 188.2 (2014): 102-106.
Kasper, Julia Christina, et al. "Development of a lyophilized plasmid/LPEI polyplex formulation with long-term stability—A step closer from promising technology to application." *Journal of controlled release* 151.3 (2011): 246-255.
International Search Report in International Application No. PCT/EP2019/060646, dated Jun. 11, 2019.
Werth, et al., "A Low Molecular Weight Fraction of Polyethylenimine (PEI) Displays Increased Transfection Efficiency of DNA and siRNA in Fresh or Lyophilized Complexes," 112(2), 257-270 (2006), retrieved from: https://pubmed.ncbi.hlm.nih.gov/16574264/.
Andries, et al., "Comparison of the Gene Transfer Efficiency of mRNA/GL67 and pDNA/GL67 Complexes in Respiratory Cells," Molecular Pharmaceutics, 9: 2136-2145 (2012).

(Continued)

*Primary Examiner* — Mina Haghighatian
(74) *Attorney, Agent, or Firm* — Morse, Barnes-Brown & Pendleton, P.C.; Lisa M. Warren, Esq.; Erin E. Bryan, Esq.

(57) ABSTRACT

Provided is a composition comprising (i) a nano- or microparticle formulation of a therapeutically active agent which is suspended in a liquid phase, and (ii) at least one cryoprotective additive selected from C3-C5 alkanes substituted by one or two hydroxy groups which stabilizes the particle formulation. Further aspects relate to a solid composition which can be obtained by freezing the stabilized composition, and to processes for the preparation of the compositions in accordance with the invention.

19 Claims, 3 Drawing Sheets

(56) References Cited

OTHER PUBLICATIONS

Andries, O, et al. "Innate immune response and programmed cell death following carrier-mediated delivery of unmodified mRNA to respiratory cells." Journal of controlled release 167(2): 57-166 (2013).
Karikó, et al., "Incorporation of Pseudouridine Into mRNA Yields Superior Nonimmunogenic Vector With Increased Translational Capacity and Biological Stability," Molecular Therapy 16(11 ): 1833-1840 (2008).
Thapa, B., et al, "Mechanism, Current Challenges and New Approaches for Non Viral Gene Delivery," Polymers and Nanomaterials for Gene Therapy, pp. 1-27 (2016).
International Search Repot for International Application No. PCT/EP2019/060644, dated Jun. 12, 2019.
International Search Report for International Application No. PCT/EP2019/071619, dated Nov. 7, 2019.
Non-Final Office Action from U.S. Appl. No. 17/050,441, mailed Oct. 7, 2022.
Non-Final Office Action from U.S. Appl. No. 17/268,435, dated: Aug. 22, 2023.
Final Office Action in U.S. Appl. No. 17/050,441, dated Aug. 30, 2023.
Final Office Action in U.S. Appl. No. 17/268,435; dated: Feb. 9, 2024.
Non-Final Office Action in U.S. Appl. No. 17/268,435, dated: Sep. 25, 2024.

* cited by examiner

CRYOPROTECTIVE AGENTS FOR PARTICULATE FORMULATIONS

RELATED APPLICATIONS

This application is a national stage filing under 35 U.S.C. 371 of International Application No.: PCT/EP2019/060646, filed Apr. 25, 2019, which claims priority to European Application No. 18189010.4, filed Aug. 14, 2018, and European Application No. 18169325.0 filed Apr. 25, 2018. The entire contents of the above applications are incorporated herein by reference in their entirety. International Application No. PCT/EP2019/060646 was published under PCT Article 21(2) in English.

The present invention relates to the stabilization of compositions which comprise a particle formulation of a therapeutically active agent, in particular a formulation comprising nanoparticles or microparticles.

Nanoparticle and microparticle formulations are known for their ability to allow therapeutically active agents to enter the body by application to or via the respiratory tract. However, many active agents formulated as nano- or microparticles suffer from limited stability at room temperature, and even in a refrigerated state (e.g. at 2-8° C.). A frozen formulation would significantly improve the long-term stability and thus the applicability of therapeutically active agents formulated as nano- or microparticles. However, freezing in general leads to aggregation processes which are accompanied by a loss of function. Although the addition of conventional cryoprotective additives prevents particle aggregation during freezing (e.g. W. Abdelwahed et al., Adv. Drug Del. Rev. 58 (2006), 1688-1713; J. C. Kasper et al., J. Contr. Rel. 151 (2011), 246-255), problems remain in that the resulting formulation is not functional after pulmonary application. Thus, the stabilization of nano- or microparticles during freezing while maintaining their functionality for application to or via the respiratory tract could not be reliably achieved with standard cryoprotectants, such as sugars.

In the context of the present invention, a class of additives has been identified which unexpectedly allows freezing of nano- or microparticle formulations while maintaining their functionality during application to or via the respiratory tract. Compositions combining the particle formulations with such cryoprotective additives allow the formulations to be conveniently stored and/or transported in a solid, frozen state prior to their application.

Thus, the present invention provides, in accordance with a first aspect, a composition comprising (i) a nano- or microparticle formulation of a therapeutically active agent which is suspended in a liquid phase, and (ii) at least one cryoprotective additive selected from C3-C5 alkanes substituted by one or two hydroxy groups.

In accordance with a second aspect, the invention provides a solid composition comprising (i) a nano- or microparticle formulation of a therapeutically active agent, and (ii) at least one cryoprotective additive selected from C3-C5 alkanes substituted by one or two hydroxy groups, which is obtainable by freezing the composition according to the first aspect.

In the following, the composition in accordance with the first aspect may also be referred to herein as the "suspension composition", and the composition in accordance with the second aspect as the "solid composition".

A further aspect of the invention relates to a process for the preparation of a composition in accordance with the above first aspect, said process comprising a) providing a nano- or microparticle formulation of a therapeutically active agent which is suspended in a liquid phase, and b) adding least one cryoprotective additive selected from C3-C5 alkanes substituted by one or two hydroxy groups to the liquid phase, wherein the addition of the cryoprotective additive to the liquid phase may be accomplished prior to, during or after providing the nano- or microparticle formulation suspended in the liquid phase.

Similarly, the invention provides, in accordance with a further aspect, a process for the preparation of the solid composition in accordance with the above second aspect, said process comprising:

a first step of preparing a composition in accordance with the above first aspect by a process comprising a) providing a nano- or microparticle formulation of a therapeutically active agent which is suspended in a liquid phase, and b) adding least one cryoprotective additive selected from C3-C5 alkanes substituted by one or two hydroxy groups to the liquid phase, wherein the addition of the cryoprotective additive to the liquid phase may be accomplished prior to, during or after providing the nano- or microparticle formulation suspended in the liquid phase, and a second step of freezing the composition obtained in the first step.

A further aspect of the invention relates to a method of preserving a nano- or microparticle formulation of a therapeutically active agent, said method comprising providing a suspension composition in accordance with the above first aspect, and freezing the composition. Still a further aspect relates to the use of a compound selected from C3-C5 alkanes substituted by one or two hydroxy groups as a cryoprotective additive for a composition comprising a nano- or microparticulate formulation of a therapeutically active agent.

Still a further aspect of the invention provides a device for forming an aerosol from a particulate composition suspended in a liquid or for nebulising such a composition, which device comprises the composition in accordance with the first aspect of the invention. A related aspect provides the composition in accordance with the first aspect of the invention for use in the treatment or prevention of a disease, wherein the composition is to be administered to or via the respiratory tract.

In the following, a detailed description will be provided of the invention and of its aspects discussed above. It will be appreciated in this context that these aspects are closely interrelated. Thus, it will be understood that the detailed information which is provided with regard to features of one aspect will apply also for other aspects which rely on this feature, unless indicated otherwise.

Therapeutically Active Agent

The compositions in accordance with the invention comprise a nano- or microparticle formulation of a therapeutically active agent. A variety of therapeutically active agents are known as being suitable for such particle formulations. In this context, the reference to a therapeutic activity includes agents which are administered to a patient to treat a disease or disorder, as well as agents which are administered to prevent a disease or disorder from affecting a patient.

A therapeutically active agent which is preferred for use in the context of the present invention is a nucleic acid. Among nucleic acids as therapeutically active agents comprised in the nano- or microparticle formulations, further preference is given to RNA, more preferably single stranded RNA, and most preferred is mRNA, including modified mRNA.

The term "nucleic acid" encompasses all forms of naturally occurring types of nucleic acids as well as chemically and/or enzymatically synthesized nucleic acids and also encompasses nucleic acid analogues and nucleic acid derivatives such as e.g. locked nucleic acids (LNA), peptide nucleic acids (PNA), oligonucleoside thiophosphates and phosphotriesters, morpholino oligonucleotides, cationic oligonucleotides (U.S. Pat. No. 6,017,700 A, WO/2007/069092), substituted ribo-oligonucleotides or phosphorothioates. Furthermore, the term "nucleic acid" also refers to any molecule that comprises nucleotides or nucleotide analogues. There are no limitations concerning sequence or size of a nucleic acid comprised in the composition of the present invention. The nucleic acid is predominantly defined by the biological effect that is to be achieved at the biological target the composition of the present invention is delivered to. For instance, in the case of an application in gene or nucleic acid therapy, the nucleic acid or nucleic acid sequence can be defined by the gene or gene fragment that is to be expressed or by the intended substitution or repair of a defective gene or any gene target sequence or by the target sequence of a gene to be inhibited, knocked-down or down-regulated.

The term "nucleic acid" encompasses oligonucleotides or polynucleotides, including deoxyribonucleic acid (DNA) and ribonucleic acid (RNA). As regards RNA, in principle any type of RNA can be employed in the context of the present invention. In a preferred embodiment the RNA is a single-stranded RNA. The term "single-stranded RNA" means a single consecutive chain of ribonucleotides in contrast to RNA molecules in which two or more separate chains form a double-stranded molecule due to hybridization of the separate chains. The term "single-stranded RNA" does not exclude that the single-stranded molecule forms in itself double-stranded structures such as loops, secondary or tertiary structures.

The term "RNA" covers RNA which codes for an amino acid sequence as well as RNA which does not code for an amino acid sequence. It has been suggested that more than 80% of the genome contains functional DNA elements that do not code for proteins. These noncoding sequences include regulatory DNA elements (binding sites for transcription factors, regulators and coregulators etc.) and sequences that code for transcripts that are never translated into proteins. These transcripts, which are encoded by the genome and transcribed into RNA but do not get translated into proteins, are called noncoding RNAs (ncRNAs). Thus, in one embodiment the RNA is a noncoding RNA. Preferably, the noncoding RNA is a single-stranded molecule. Studies demonstrate that ncRNAs are critical players in gene regulation, maintenance of genomic integrity, cell differentiation, and development, and they are misregulated in various human diseases. There are different types of ncRNAs: short (20-50 nt), medium (50-200 nt), and long (>200 nt) ncRNAs. Short ncRNA includes microRNA (miRNA), small interfering RNA (siRNA), piwi-interacting RNA (piRNA), and transcription initiating RNA (tiRNA). Examples of medium ncRNAs are small nuclear RNAs (snRNAs), small nucleolar RNAs (snoRNAs), transfer RNAs (tRNAs), transcription start-site-associated RNAs (TSSaRNAs), promoter-associated small RNAs (PASRs), and promoter upstream transcripts (PROMPTs). Long noncoding RNAs (lncRNA) include long-intergenic noncoding RNA (lincRNA), anti-sense-lncRNA, intronic lncRNA, transcribed ultra-conserved RNAs (T-UCRs), and others (Shan A, Mandal S S, ChemMedChem. 2014 Mar. 26. doi: 10.1002/cmdc.201300534). Of the above-mentioned non-coding RNAs only siRNA is double-stranded. Thus, since in a preferred embodiment the noncoding RNA is single-stranded, it is preferred that the noncoding RNA is not siRNA. In another embodiment the RNA is a coding RNA, i.e. an RNA which codes for an amino acid sequence. Such RNA molecules are also referred to as mRNA (messenger RNA) and are single-stranded RNA molecules. The nucleic acids may be made by synthetic chemical and enzymatic methodology known to one of ordinary skill in the art, or by the use of recombinant technology, or may be isolated from natural sources, or by a combination thereof. The oligo- or polynucleotides may optionally comprise unnatural nucleotides and may be single or double or triple stranded. "Nucleic acid" also refers to sense and anti-sense oligo- or polynucleotides, that is, a nucleotide sequence which is complementary to a specific nucleotide sequence in a DNA and/or RNA.

Preferably, the term nucleic acid in the context of the present invention refers to RNA, more preferably to single stranded RNA, and most preferably to mRNA. It will be understood that, unless indicated otherwise in a specific context, the term mRNA as used herein, encompasses modified mRNA. In other words, the nano- or microparticles used in the context of the present invention preferably comprise a nucleic acid as a therapeutically active agent, and the nucleic acid is preferably RNA, more preferably single stranded RNA, and most preferably mRNA, which mRNA may be modified mRNA.

Messenger RNAs (mRNA) are copolymers which are built up of nucleoside phosphate building blocks mainly with adenosine, cytidine, uridine and guanosine as nucleosides, which as intermediate carriers bring the genetic information from the DNA in the cell nucleus into the cytoplasm, where it is translated into proteins. They are thus suitable as alternatives for gene expression.

In the context of the present invention, mRNA should be understood to mean any polyribonucleotide molecule which, if it comes into the cell, is suitable for the expression of a protein or fragment thereof or is translatable to a protein or fragment thereof. The term "protein" here encompasses any kind of amino acid sequence, i.e. chains of two or more amino acids which are each linked via peptide bonds and also includes peptides and fusion proteins.

The mRNA contains a ribonucleotide sequence which encodes a protein or fragment thereof whose function in the cell or in the vicinity of the cell is needed or beneficial, e.g. a protein the lack or defective form of which is a trigger for a disease or an illness, the provision of which can moderate or prevent a disease or an illness, or a protein which can promote a process which is beneficial for the body, in a cell or its vicinity. The mRNA may contain the sequence for the complete protein or a functional variant thereof. Further, the ribonucleotide sequence can encode a protein which acts as a factor, inducer, regulator, stimulator or enzyme, or a functional fragment thereof, where this protein is one whose function is necessary in order to remedy a disorder, in particular a metabolic disorder or in order to initiate processes in vivo such as the formation of new blood vessels, tissues, etc. Here, functional variant is understood to mean a fragment which in the cell can undertake the function of the protein whose function in the cell is needed or the lack or defective form whereof is pathogenic. In addition, the mRNA may also have further functional regions and/or 3' or 5' noncoding regions. The 3' and/or 5' noncoding regions can be the regions naturally flanking the protein-encoding sequence or artificial sequences which contribute to the stabilization of the RNA. Those skilled in the art can determine the sequences suitable for this in each case by routine experiments.

In a preferred embodiment, the mRNA contains an m7GpppG cap, an internal ribosome entry site (IRES) and/or a polyA tail at the 3' end in particular in order to improve translation. The mRNA can have further regions promoting translation.

In a preferred embodiment the mRNA is an mRNA which contains a combination of modified and unmodified nucleotides. Preferably, it is an mRNA containing a combination of modified and unmodified nucleotides as described in WO2011/012316. The mRNA described therein is reported to show an increased stability and diminished immunogenicity. In a preferred embodiment, in such a modified mRNA 5 to 50% of the cytidine nucleotides and 5 to 50% of the uridine nucleotides are modified. The adenosine- and guanosine-containing nucleotides can be unmodified. The adenosine and guanosine nucleotides can be unmodified or partially modified, and they are preferably present in unmodified form. Preferably 10 to 35% of the cytidine and uridine nucleotides are modified and particularly preferably the content of the modified cytidine nucleotides lies in a range from 7.5 to 25% and the content of the modified uridine nucleotides in a range from 7.5 to 25%. It has been found that in fact a relatively low content, e.g. only 10% each, of modified cytidine and uridine nucleotides can achieve the desired properties. It is particularly preferred that the modified cytidine nucleotides are 5-methylcytidin residues and the modified uridine nucleotides are 2-thiouridin residues. Most preferably, the content of modified cytidine nucleotides and the content of the modified uridine nucleotides is 25%, respectively.

In another preferred embodiment, the mRNA may be combined with target binding sites, targeting sequences and/or with micro-RNA binding sites, in order to allow activity of the desired mRNA only in the relevant cells. In a further preferred embodiment, the RNA can be combined with micro-RNAs or shRNAs downstream of the 3' polyA tail.

Furthermore, the term "nucleic acid(s)" may refer to DNA or RNA or hybrids thereof or any modification thereof that is known in the state of the art (see, e.g., U.S. Pat. No. 8,278,036, WO 2013/052523, WO 2011/012316, U.S. Pat. Nos. 5,525,711, 4,711,955, 5,792,608 or EP 302175, (Lorenz et al. 2004, Bioorg Med Chem Lett, 14, 4975-4977; Soutschek et al. 2004, Nature, 432, 173-178) for examples of modifications). Such nucleic acid molecule(s) are single- or double-stranded, linear or circular, natural or synthetic, and without any size limitation. For instance, the nucleic acid molecule(s) may be genomic DNA, cDNA, mRNA, antisense RNA, ribozyme, or small interfering RNAs (siRNAs), micro RNAs, antagomirs, or short hairpin RNAs (shRNAs), tRNAs or long double-stranded RNAs or a DNA construct encoding such RNAs or chimeraplasts (Colestrauss et al. 1996, Science, 273, 1386-1389), or aptamers, clustered regularly interspaced short palindromic repeats ("CRISPR" for RNA-guided site-specific DNA cleavage) (Cong et al. 2013, Science, 339, 819-823), or RNA and DNA. Said nucleic acid molecule(s) may be in the form of plasmids, cosmids, artificial chromosomes, viral DNA or RNA, bacteriophage DNA, coding and non-coding single-stranded (mRNA) or double-stranded RNA and oligonucleotide(s), wherein any of the state of the art modifications in the sugar backbone and/or in the bases as described above and 3'- or 5'-modifications are included. In a particularly preferred embodiment the nucleic acid is RNA, more preferably mRNA or siRNA, and most preferably mRNA.

The nucleic acid(s) may contain a nucleotide sequence encoding a polypeptide that is to be expressed in a target cell. Methods which are well known to those skilled in the art can be used to construct recombinant nucleic acid molecules; see, for example, the techniques described in Sambrook et al., Molecular Cloning A Laboratory Manual, Cold Spring Harbor Laboratory (2001) N.Y. and Ausubel et al., Current Protocols in Molecular Biology, Green Publishing Associates and Wiley Interscience, N.Y. (1989).

As noted above, the nucleic acid would be comprised as a preferred therapeutically active agent in the nano- or microparticle formulation. In general, therapeutic effects can be achieved by the interaction of the nucleic acid with cellular molecules and organelles. Such interaction alone may for example activate the innate immune system, as is the case for certain CpG oligonucleotides and sequences designed to specifically interact with toll-like and other extra- or intracellular receptors. Furthermore, the uptake or introduction of nucleic acids in cells can be intended to lead to the expression of nucleotide sequences such as genes comprised in the nucleic acid, can be intended for the downregulation, silencing or knockdown of endogenous gene expression as a consequence of the intracellular presence of an introduced exogenous nucleic acid, or can be intended for the modification of endogenous nucleic acid sequences such as repair, excision, insertion or exchange of selected bases or of whole stretches of endogenous nucleic acid sequences, or can be intended for interference with virtually any cellular process as a consequence of the intracellular presence and interaction of an introduced exogenous nucleic acid. Overexpression of introduced exogenous nucleic acids may be intended to compensate or complement endogenous gene expression, in particular in cases where an endogenous gene is defective or silent, leading to no, insufficient or a defective or a dysfunctional product of gene expression such as is the case with many metabolic and hereditary diseases like cystic fibrosis, hemophilia or muscular dystrophy to name a few. Overexpression of introduced exogenous nucleic acids may also be intended to have the product of the expression interact or interfere with any endogenous cellular process such as the regulation of gene expression, signal transduction and other cellular processes. The overexpression of introduced exogenous nucleic acids may also be intended to give rise to an immune response in context of the organism in which a transfected or transduced cell resides or is made to reside. Examples are the genetic modification of antigen-presenting cells such as dendritic cells in order to have them present an antigen for vaccination purposes. Other examples are the overexpression of cytokines in tumors in order to elicit a tumor-specific immune response. Furthermore, the overexpression of introduced exogenous nucleic acids may also be intended to generate in vivo or ex vivo transiently genetically modified cells for cellular therapies such as modified T-cells or precursor or stem or other cells for regenerative medicine.

Downregulation, silencing or knockdown of endogenous gene expression for therapeutic purposes can for example be achieved by RNA interference (RNAi), with ribozymes, antisense oligonucleotides, tRNAs, long double-stranded RNA where such downregulation can be sequence-specific or unspecific and can also lead to cell death as is the case when long double-stranded RNAs are introduced into cells. Downregulation, silencing or knockdown of endogenous or pre-existing gene expression can be useful in the treatment of acquired, hereditary or spontaneously incurring diseases including viral infections and cancer. It can also be envisaged that the introduction of nucleic acids into cells can be practiced as a preventive measure in order to prevent, for example, viral infection or neoplasias. Downregulation, silencing or knockdown of endogenous gene expression can be exerted on the transcriptional level and on the translational level. Multiple mechanisms are known to the one skilled in the art and include for example epigenetic modifications, changes in chromatin structure, selective binding of transcription factors by the introduced nucleic acid, hybridization of the introduced nucleic acid to complementary sequences in genomic DNA, mRNA or other RNA species by base pairing including unconventional base pairing mechanisms such as triple helix formation. Similarly, gene repair, base or sequence changes can be achieved at the genomic level and at the mRNA level including exon skipping. Base or sequence changes can for example be achieved by RNA-guided site-specific DNA cleavage, by cut and paste mechanisms exploiting trans-splicing, trans-splicing ribozymes, chimeraplasts, splicosome-mediated RNA trans-splicing, or by exploiting group II or retargeted introns, or by exploiting insertional mutagenesis mediated by viruses or exploiting targeted genomic insertion using prokaryotic, eukaryotic or viral integrase systems. As nucleic acids are the carriers of the building plans of living systems and as they participate in many cellular processes in a direct and indirect manner, in theory any cellular process can be influenced by the introduction of nucleic acids into cells from outside. Notably, this introduction can be carried out directly in vivo and ex vivo in cell or organ culture followed by transplantation of thus modified organs or cells into a recipient. The nano- or microparticle formulations for use in the context of the present invention with nucleic acids as therapeutically active agent may be useful for all purposes described above.

It will be understood that the nano- or microparticle formulations for use in the context of the present invention can comprise a single therapeutically active agent, but may alternatively comprise a combination of two or more therapeutically active agents, e.g. in the form of particles comprising two or more types of therapeutically active agent combined in single particles, or in the form of a blend of particles which differ in the type of therapeutically active agent contained therein.

The Particle Formulation

The compositions in accordance with the invention (i.e. the suspension composition and the solid composition) comprise a nano- or microparticle formulation of the therapeutically active agent. As will be understood by the skilled reader, the "or" is used in this context in a non-exclusive manner, unless specifically indicated otherwise. Thus, the reference to nano- or microparticle formulations encompasses formulations containing nanoparticles comprising the therapeutically active agent, formulations containing microparticles comprising the therapeutically active agent, and formulations containing both nanoparticles and microparticles comprising the therapeutically active agent. For sake of convenience, the "nano- or microparticle formulation" may be abbreviated in the discussion of the invention herein as "particle formulation" or "particulate formulation". Similarly, the nano- or microparticles may be referred to as "the particles".

The particles of the nano- or microparticle formulation may contain the therapeutically active agent as the only component. However, it is preferred that the particles contain the therapeutically active agent in combination with one or more further components. These further components are typically pharmaceutically acceptable components, e.g. excipients or additives which are pharmaceutically acceptable.

The nano- or microparticle formulation in the composition in accordance with the invention comprises nano- or microparticles which contain the therapeutically active agent. The particle formulation may consist of such nano- or microparticles. As used herein, the term nanoparticles refers generally to particles with a diameter in the nanometer size range, i.e. a diameter of 1 nm or more and below 1000 nm. The term microparticles refers generally to particles with a diameter in the micrometer size range, i.e. a diameter of 1000 nm or more and 100 µm or less.

The nano- or microparticle formulation typically shows an average particle diameter in the range of 1 to 4000 nm, more preferably 2 to 2500 nm, and most preferably 5 to 1000 nm. The upper limit for the diameter of the single particles in the nano- or microparticle formulation is preferably 20 µm, more preferably 10 µm and most preferably 5 µm. Thus, as will be understood from the above, a strongly preferred particle formulation would be one with an average particle diameter in the range of 5 to 1000 nm, and particles with a maximum particle diameter of 5 µm.

The particle diameters and the average particle diameter of the nano- or microparticle formulation as referred to herein can be conveniently determined via dynamic light scattering (DLS). Generally, the diameters and the average diameter as referred to herein are indicated as hydrodynamic diameters of the particles in a suspended state determined via dynamic light scattering. Since the effect of temperature is taken into account by the measurement equipment (e.g. Malvern ZetaSizer) when reporting the results, the measured diameters are generally not temperature dependent. However, the measurement is typically carried out at room temperature (25° C.). As a suspension medium for DLS measurements, for example water or water containing the cryoprotective additive can be used, as appropriate. In the case of a frozen solid composition, the particle diameters are typically determined after thawing the composition. In cases where an average particle size or an average particle diameter is indicated, the average is typically the z-average unless indicated otherwise.

Preferably, the nano- or microparticle formulation has an active load, expressed as the weight of the therapeutically active agent to the total weight of the particles in the particle formulation, in the range of 0.1 to 95% (w/w), more preferably 0.5 to 90% (w/w), most preferably 1 to 80% (w/w).

In addition to the therapeutically active agent, the particles of the nano- or microparticle formulation for use in the context of the present invention may comprise one or more further components, e.g. excipients or additives which are typically pharmaceutically acceptable components. For example, such further components may facilitate the transport to specific sites or promote the further uptake of the particles into specific sites after they have been administered to a patient, or they may help to stabilize the particles or the therapeutically active agent contained therein.

If the therapeutically active agent is a nucleic acid, a useful component for the particles comprising the nucleic acid is a viral vector. Such viral vectors are known in the art, as discussed e.g. in the review article of A. G. Silva et al., Current Drug Metabolism, 16, 2015, 3-16, and in the literature discussed therein.

Furthermore, various polymers are established as excipients for the formulation of therapeutically active agents in particle formulations comprising nano- or microparticles.

Such polymers can also provide a further component for the particulate formulations as used in the context of the present invention. For example, suitable polymeric excipients include polymers which can be resorbed in the body after administration of the particles to a patient, such as polymers, including natural polymers, formed from amino acids, carbohydrates, or from lactic and/or glycolic acid.

For particle formulation comprising a nucleic acid, preferably RNA, more preferably single stranded RNA, and most preferably mRNA, as therapeutically active agent, a preferred further component is a cationic excipient. Such a cationic excipient and a nucleic acid, which provides negative charges, can form a complex together. It will be understood that the reference to a cationic excipient does not exclude the presence of anionic groups or of neutral regions in the respective excipient, as long as the cationic groups are present in a sufficiently high number to provide an overall cationic charge of the excipient.

Thus, in accordance with one preferred embodiment, the nano- or microparticle formulations as referred to in the context of the present invention are particle formulations which comprise a nucleic acid, preferably RNA, more preferably single stranded RNA, and most preferably mRNA, as the therapeutically active agent in the form of a complex formed by the nucleic acid and a cationic oligomer or polymer, preferably a polymer, as a cationic excipient. Such a complex is referred to in the art also as a polyplex.

Such polyplexes, and suitable oligomers or polymers which are able to form them, are known in the art. Exemplary suitable cationic oligomers or polymers for the formation of polyplexes, which may also be used in the particle formulations referred to in the context of the present invention, are discussed in A. C. Silva et al., Current Drug Metabolism, 16, 2015, 3-16, and in the literature referred to therein, in J. C. Kasper et al., J. Contr. Rel. 151 (2011), 246-255, in WO 2014/207231 and in the literature referred to therein, and in WO 2016/097377 and in the literature referred to therein.

Suitable cationic oligomers or polymers include in particular cationic oligomers or polymers comprising a plurality of units wherein an amino group is contained. The amino groups may be protonated to provide the cationic charge of the polymer.

In a polyplex formed from a nucleic acid and a cationic oligomer or polymer comprising a plurality of units wherein an amino group is contained, the N/P ratio of the number of amine nitrogen atoms in the cationic oligomer or polymer to the number of phosphate groups in the nucleic acid is preferably in the range of 1 to 100, more preferably 2 to 80, and most preferably 3 to 60

Among the cationic oligomers or polymers comprising a plurality of amino groups, oligomers or polymers are preferred which comprise a plurality of units independently selected from the following (1), (2), (3) and (4):

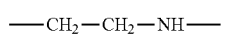 (1)

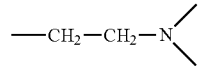 (2)

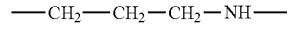 (3)

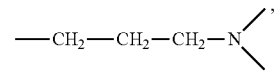 (4)

wherein one or more of the nitrogen atoms of the repeating units (1), (2), (3) and/or (4) may be protonated to provide the cationic charge of the polymer.

Particularly preferred as cationic oligomers or polymers for the provision of a particle formulation are the following four classes of oligomers or polymers comprising a plurality of units wherein an amino group is contained.

As the first preferred class, poly(ethylene imine) ("PEI") is mentioned, including branched poly(ethylene imine) ("br-PEI").

The second preferred class of cationic oligomers or polymers are oligomers or polymers comprising a plurality of groups of the following formula (II) as a side chain and/or as a terminal group, as they are disclosed in WO 2014/207231 (applicant ethris GmbH):

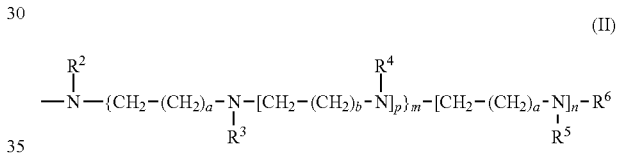

(II)

wherein the variables a, b, p, m, n and $R^2$ to $R^6$ are defined as follows, independently for each group of formula (II) in a plurality of such groups:
a is 1 and b is an integer of 2 to 4; or a is an integer of 2 to 4 and b is 1,
p is 1 or 2,
m is 1 or 2; n is 0 or 1 and m+n is ≥2; and
$R^2$ to $R^5$ are, independently of each other, selected from hydrogen; a group —$CH_2$—$CH(OH)$—$R^7$, —$CH(R^7)$—$CH_2$—OH, —$CH_2$—$CH_2$—(C=O)—O—$R^7$, —$CH_2$—$CH_2$—(C=O)—NH—$R^7$ or —$CH_2$—$R^7$ wherein $R^7$ is selected from C3-C18 alkyl or C3-C18 alkenyl having one C—C double bond; a protecting group for an amino group; and a poly(ethylene glycol) chain;
$R^6$ is selected from hydrogen; a group —$CH_2$—CH(OH)—$R^7$, —$CH(R^7)$—$CH$—OH, —$CH_2$—$CH_2$—(C=O)—O—$R^7$, —$CH_2$—$CH_2$—(C=O)—NH—$R^7$ or —$CH_2$—$R^7$ wherein $R^7$ is selected from C3-C18 alkyl or C3-C18 alkenyl having one C—C double bond; a protecting group for an amino group; —C(NH)—$NH_2$; a poly(ethylene glycol) chain; and a receptor ligand,
and wherein one or more of the nitrogen atoms indicated in formula (II) may be protonated to provide a cationic group of formula (II).

As regards further preferred definitions of these oligomers or polymers, and of the variables contained in formula (II) above, the respective disclosure in WO 2014/207231 also applies for the invention described herein, unless specifically indicated otherwise. Also in terms of the compositions which contain nucleic acids and these oligomers and polymers in the form of polyplexes, the information provided in WO 2014/207231 is applicable for the particle formulations referred to herein.

The third preferred class of cationic oligomers or polymers are oligomers or polymers comprising a plurality of groups of the following formula (III) as repeating units, as they are disclosed in WO 2014/207231 (applicant ethris GmbH):

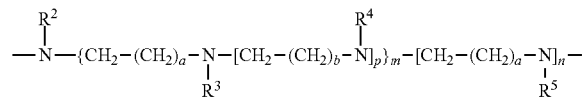

wherein the variables a, b, p, m, n and $R^2$ to $R^5$ are defined as follows, independently for each group of formula (III) in a plurality of such groups:

a is 1 and b is an integer of 2 to 4; or a is an integer of 2 to 4 and b is 1,
p is 1 or 2,
m is 1 or 2; n is 0 or 1 and m+n is ≥2; and
$R^2$ to $R^5$ are, independently of each other, selected from hydrogen; a group —$CH_2$—$CH(OH)$—$R^7$, —$CH(R^7)$—$CH_2$—$OH$, —$CH_2$—$CH_2$—$(C=O)$—$O$—$R^7$ or —$CH_2$—$CH_2$—$(C=O)$—$NH$—$R^7$ or —$CH_2$—$R^7$ wherein $R^7$ is selected from C3-C18 alkyl or C3-C18 alkenyl having one C—C double bond; a protecting group for an amino group; —$C(NH)$—$NH_2$; and a poly(ethylene glycol) chain;
and wherein one or more of the nitrogen atoms indicated in formula (III) may be protonated to provide a cationic group of formula (III).

As regards further preferred definitions of these oligomers or polymers, and of the variables contained in formula (III) above, the respective disclosure in WO 2014/207231 also applies for the invention described herein, unless specifically indicated otherwise. Also in terms of the compositions which contain nucleic acids and these oligomers and polymers in the form of polyplexes, the information provided in WO 2014/207231 is applicable for the particle formulations referred to herein.

The fourth preferred class of cationic oligomers or polymers is provided by a statistical copolymer as it is disclosed in WO 2016/097377 (applicant ethris GmbH). It comprises a plurality of repeating units (a) independently selected from repeating units of the following formulae (a1) and (a2):

—$CH_2$—$CH_2$—$NH$— (a1)

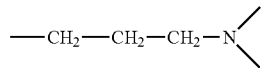 (a2)

and a plurality of repeating units (b) independently selected from repeating units of the following formulae (b1) to (b4):

—$CH_2$—$CH_2$—$CH_2$—$NH$— (b1)

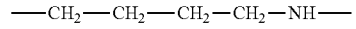 (b2)

—$CH_2$—$CH_2$—$CH_2$—$CH_2$—$NH$— (b3)

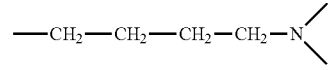 (b4)

and the molar ratio of the sum of the repeating units (a) to the sum of the repeating units (b) lies within the range of 0.7/1.0 to 1.0/0.7, and one or more of the nitrogen atoms of the repeating units (a) and/or (b) contained in the copolymer may be protonated to provide a cationic copolymer.

As regards further preferred definitions of this copolymer, the respective disclosure in WO 2016/097377 also applies for the invention described herein, unless specifically indicated otherwise. As noted therein, a particularly preferred copolymer is a linear copolymer which comprises repeating units (a1) and (b1), or which consists of repeating units (a1) and (b1). Also in terms of the compositions which contain nucleic acids and these oligomers and polymers in the form of polyplexes, the information provided in WO 2016/097377 is applicable for the particle formulations referred to herein.

In accordance with another preferred embodiment, the nano- or microparticle formulations as referred to in the context of the present invention are particle formulations which comprise a nucleic acid, preferably RNA, more preferably single stranded RNA, and most preferably mRNA, as the therapeutically active agent in the form of a complex formed by the nucleic acid and a cationic lipid or a cationic lipidoid as a cationic excipient. Unless defined otherwise, such complexes encompass in particular lipoplexes, liposomes and lipid nanoparticles ("LNP") comprising a complex of the nucleic acid and a cationic lipid or a cationic lipidoid.

Suitable cationic lipids or cationic lipids and lipidoids, which may also be used for the formation of a complex with nucleic acid in the context of the present invention, are known in the art, and are discussed e.g. in A. C. Silva et al., Current Drug Metabolism, 16, 2015, 3-16, and in the literature referred to therein, in US 2017/0267631, WO 2016/081029, WO 2011/071860, WO 2016/118697, U.S. Pat. No. 8,450,298 B2, WO 2014/207231 and in E. R. Lee et al., Human Gene Therapy 7:1701-1717, Sep. 10, 1996. The term "lipidoid" is established for substances which do not have a structure of a lipid, but show the characteristics of a lipid.

A preferred class of lipidoids for use in the particle formulations containing a nucleic acid, preferably RNA, more preferably single stranded RNA, and most preferably mRNA, as the therapeutically active agent in the form of a complex with the cationic lipidoid, e.g. as a lipoplex, liposome or LNP, are lipidoids having the structure of the following formula (IV), as disclosed in WO 2014/207231 (applicant: ethris GmbH):

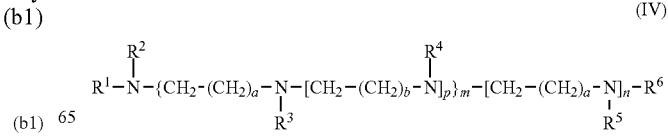

wherein the variables a, b, p, m, n and $R^1$ to $R^6$ are defined as follows:
a is 1 and b is an integer of 2 to 4; or a is an integer of 2 to 4 and b is 1,
p is 1 or 2,
m is 1 or 2; n is 0 or 1 and m+n is ≥2; and
$R^1$ to $R^6$ are independently of each other selected from hydrogen; a group —$CH_2$—CH(OH)—$R^7$, —CH($R^7$)—$CH_2$—OH, —$CH_2$—$CH_2$—(C=O)—O—$R^7$, —$CH_2$—$CH_2$—(C=O)—NH—$R^7$ or —$CH_2$—$R^7$ wherein $R^7$ is selected from C3-C18 alkyl or C3-C18 alkenyl having one C—C double bond; a protecting group for an amino group; —C(NH)—$NH_2$; a poly (ethylene glycol) chain; and a receptor ligand; provided that at least two residues among $R^1$ to $R^6$ are a group —$CH_2$—CH(OH)—$R^7$, —CH($R^7$)—$CH_2$—OH, —$CH_2$—$CH_2$—(C=O)—O—$R^7$, —$CH_2$—$CH_2$—(C=O)—NH—$R^7$ or —$CH_2$—$R^7$ wherein $R^7$ is selected from C3-C18 alkyl or C3-C18 alkenyl having one C—C double bond;
and wherein one or more of the nitrogen atoms indicated in formula (IV) may be protonated to provide a cationic lipidoid of formula (IV).

As regards further preferred definitions of these lipidoids, and of the variables contained in formula (IV) above, the respective disclosure in WO 2014/207231 also applies for the invention described herein, unless specifically indicated otherwise. Also in terms of the compositions which contain nucleic acids and these lipidoids in the form of complexes, e.g. in the form of lipoplexes, liposomes or LNPs, the information provided in WO 2014/207231 is applicable for the particle formulations referred to herein.

Another preferred type of lipid for the provision of a complex of a nucleic acid with a cationic lipid that may be contained in the particle formulations as referred to herein is the cationic lipid Genzyme Lipid 67 (GL67). This cationically derivatized lipid is very useful for the complexation of nucleic acids, preferably RNA, more preferably single stranded RNA and most preferably mRNA.

For a particle formulation comprising a complex of a nucleic acid formed with a cationic lipid or cationic lipidoid containing amino groups, e.g. with a lipidoid of formula (IV), the N/P ratio in the lipoplex is preferably from 1 to 100, more preferably 2 to 80, and most preferred are N/P ratios from 3 to 60.

As optional components which may be contained in the particle formulations comprising the therapeutically active agent in the form of a complex of a nucleic acid with a cationic lipid or cationic lipidoid, such as a lipoplex, LNP or liposome, mention may be made of helper lipids. They can be selected e.g. from one or more of sterols (such as cholesterol or dexmethasone), neutral lipids (such as DMPE, DOPE, DSPE, DPPE, DMPC, DOPC, DSPC, or DPPC), sphingolipids and pegylated lipids (such as DMG-PEG, DMPE-PEG or Ceramide-PEG). Such helper lipids may be used singly or in combination of two or more types thereof. Also useful as excipients for a particulate formulation of a therapeutically active agent which comprises cationic lipids or lipidoids are copolymers of polyethylene glycol (PEG) and alkylene units.

Further components suitable for the formation such complexes are referred to in A. C. Silva et al., Current Drug Metabolism, 16, 2015, 3-16, and in the literature discussed therein.

Preferably, the particle formulation comprising a complex of a nucleic acid with a cationic lipid or a cationic lipidoid contains the nucleic acid in an amount such that the ratio of the total weight of lipids and lipidoids (including any helper lipids present) to the weight of the nucleic acid is in the range of 0.1 to 200, more preferably 0.2 to 150, most preferably 0.5 to 100.

In the light of the above discussion, it will be apparent that a nano- or microparticle formulation for use in the context of the present invention is also preferred wherein the therapeutically active agent is mRNA, and the mRNA is comprised in the particle formulation in the form of a complex with a cationic polymer or oligomer, or in the form of a complex with a cationic lipid or a cationic lipidoid. With regard to suitable and preferred types of the cationic excipient, the above considerations continue to apply. Also for these preferred particle formulations, the particles in the particle formulation typically show an average particle diameter in the range of 1 to 4000 nm, more preferably 2 to 2500 nm, and most preferably 5 to 1000 nm. The upper limit for the diameter of the particles in the nano- or microparticle formulation is preferably 20 µm, more preferably 10 µm, and most preferably 5 µm.

Besides the therapeutically active agent, the particle formulation may comprise, as an optional additive or as optional additives, one or more components that exert an effector function during delivery of the therapeutic agent, and preferably during the delivery of a nucleic acid as the therapeutic agent to and into a cell. Such components can be, but are not limited to, polyanions, lipids as described above, further polycations other than those discussed above for the formation of polyplexes such as cationic peptides, shielding oligomers or polymers, poloxamers (also known as pluronics), poloxamines, targeting ligands, endosomolytic agents, cell penetrating and signal peptides, magnetic and non-magnetic nanoparticles, RNAse inhibitors, fluorescent dyes, radioisotopes or contrast agents for medical imaging. The term "effector function" encompasses any function that supports achieving an intended biological effect of the therapeutically active agent of the composition at or in a biological target or the surroundings of a biological target. For example, compositions for nucleic acid delivery have been formulated to comprise non-coding nucleic acids or non-nucleic acid polyanions as stuffer materials (Kichler et al. 2005, J Gene Med, 7, 1459-1467). Such stuffer materials are suitable for reducing the dose of a nucleic acid having an intended biological effect while maintaining the extent or degree of that effect obtained at a higher nucleic acid dose in the absence of such stuffer material. Non-nucleic acid polyanions have also been used to obtain prolonged in vivo gene expression at reduced toxicity (Uchida et al. 2011, J Control Release, 155, 296-302). The particle formulations of the present invention comprising a complex of a nucleic acid with a cationic polymer or oligomer can also comprise cationic, anionic or neutral lipids such as is the case in lipopolyplexes (Li and Huang in "Nonviral Vectors for Gene Therapy", Academic Press 1999, Chapter 13, 295-303). Lipopolyplexes may be prepared advantageously from polymers corresponding to formulae (II) or (III) as shown above with lipidoids corresponding to formula (IV) as shown above. Furthermore, the particle formulation used in the present invention can comprise oligo- or polycations other than those discussed above for the formation of polyplexes. Such additional polycations can be useful to achieve a desired degree of compaction of a nucleic acid or, in the case of polycationic peptides, can have a nuclear localization signal function such as described previously (Ritter et al. 2003, J Mol Med, 81, 708-717). Shielding polymers, such as poly(ethylene glycol) (PEG), can as well be comprised in the particle formulations used in the context of the present invention and are used frequently to stabilize e.g. complexes of nucleic acids with cationic excipients against aggregation and/or undesired interactions in a biological environment (opsonization), for example interactions with serum components, blood cells or extracellular matrix. Shielding can also be suitable to reduce the toxicity of nucleic acid-comprising compositions (Finsinger et al. 2000, Gene Ther, 7, 1183-1192). For example, shielding polymers such as PEG can be covalently coupled directly to other oligomers or polymers, or to lipids or lipidoids which may be present in the particle formulations. The coupling can be achieved in the polymer backbone, preferably, if feasible, to the terminal ends of a polymer backbone or a dendrimer. However, the coupling can also be achieved to the amino groups contained formulae (1) to (4), (II), (III), (IV) or any one of (a1), (a2) or (b1) to (b4) described above.

Other exemplary shielding polymers described in the literature which may be useful components for a particle formulation comprising a complex of a nucleic acid with a cationic excipient include hydroxyethyl starch (HES; Noga et al. Journal of Controlled Release, 2012. 159(1): 92-103, a PAS-polypeptide (Pro, Ala, Ser polypeptide: Schlapschy et a. Protein Eng Des Sel. 2013 August; 26(8):489-501 or Polysarcosine (Psar: Heller et al. Macromol Biosci 2014; 14: 1380-1395).

Targeting ligands may be useful e.g. in particle formulations for nucleic acid delivery for preferential and improved transfection of target cells (Philipp and Wagner in "Gene and Cell Therapy—Therapeutic Mechanisms and Strategy", 3rd Edition, Chapter 15. CRC Press, Taylor & Francis Group LLC, Boca Raton 2009). A targeting ligand can be any compound that confers to compositions of the present invention a target recognition and/or target binding function in a direct or indirect manner. Exemplary targeting ligands are the prostacycline analoga disclosed in WO 2011/076391, such as Iloprost or Treprostinil. An antibody may also act as a targeting ligand. As ligands for nano- or microparticles, folic acid and N-acetyl galactosamine can be mentioned. In most general terms, a target is a distinct biological structure to which a targeting ligand can bind specifically via molecular interaction and where such binding will ultimately lead to preferential accumulation of the therapeutic agent, such as a nucleic acid, comprised in the composition in a target tissue and/or at or in a target cell. Similarly to PEG (or HES and PSar) chains, targeting ligands can be coupled, e.g. to the terminal ends of a polymer backbone or a dendrimer. However, the coupling can also be achieved to the groups of formulae (1) to (4), (II), (III), (IV) or any one of (a1), (a2) or (b1) to (b4) described above.

Furthermore, endosomolytic agents such as endosomolytic peptides (Plank et al. 1998, Adv Drug Deliv Rev, 34, 21-35) or any other compound that is suited to enhance the endosomal release of an endocytosed nucleic acid are useful components of compositions of present inventions. Similarly, cell penetrating peptides (in another context also known as protein transduction domains) (Lindgren et al. 2000, Trends Pharmacol Sci, 21, 99-103) can be useful components of the composition of the present invention in order to mediate intracellular delivery of a nucleic acid. The so-called TAT peptide falls within this class and also has nuclear localization function (Rudolph et al. 2003, J Biol Chem, 278, 11411-11418).

Cryoprotective Additive

As a further component in addition to the nano- or microparticle formulation, the compositions in accordance with the invention comprise a cryoprotective additive which is selected from C3-C5 alkanes substituted by one or two hydroxy groups. As will be understood by the skilled reader, these substituted alkanes may be linear or branched alkanes. They have 3 to 5 carbon atoms. Depending on the number of hydroxy substituents, they may be referred to as mono- or dialcohols, or as alkanols or alkanediols.

Preferably, the cryoprotective additive comprises at least one secondary hydroxy group (e.g. one secondary and no further hydroxy group, or one secondary and one primary hydroxy group, or two secondary hydroxy groups).

More preferably, the cryoprotective additive is selected from 1,2-propanediol, 2-propanol, 1,2-butanediol, and 1,3-butanediol. Most preferably, the cryoprotective additive is 1,2-propanediol.

Compositions

As noted above, the invention provides as a first aspect a suspension composition and as a second aspect a solid composition, each of which comprises the nano- or microparticle formulation of the therapeutically active agent and the cryoprotective additive which have been discussed in further detail above.

Since the compositions in accordance with the invention contain a therapeutically active agent and are suitable for the administration of the therapeutically active agent to a patient, they can be referred to as therapeutic compositions or pharmaceutical compositions.

In particular, the suspension composition in accordance with the first aspect of the present invention comprises:
(i) a nano- or microparticle formulation of a therapeutically active agent which is suspended in a liquid phase, and
(ii) at least one cryoprotective additive selected from C3-C5 alkanes substituted by one or two hydroxy groups.

As will be appreciated, the information regarding suitable and preferred embodiments of the therapeutic agent, of its particle formulation, and of the cryoprotective additive continues to apply in this context.

The suspension composition preferably comprises the particles of the particle formulation in an amount so as to provide the therapeutically active agent, which is contained in the particle formulation, at a concentration of 0.01 to 50 mg/ml, more preferably 0.02 to 30 mg/ml, based on the total volume of the composition.

The cryoprotective additive is preferably contained in the suspension composition at a concentration of 0.5 to 50% w/v, more preferably 1 to 40% w/v, most preferably 1 to 30% w/v, where the percentage value indicates the weight of the cryoprotective additive in g per 100 ml of the total volume of the composition. Typically, the cryoprotective additive is contained, preferably dissolved, in the liquid phase wherein the particle formulation is suspended. However, it may also be partly associated with the particles suspended in the liquid phase.

The liquid phase of the suspension composition in accordance with the first aspect of the present invention typically contains water as a solvent. Preferably, 50% or more, more preferably 70% or more by volume (based on the total volume of the liquid phase at 20° C.) are provided by water. More preferably, water and the cryoprotective additive are the only solvents contained in the liquid phase.

As exemplary further optional additives of the liquid phase, one or more selected from salts, sugars, organic solvents and buffers may be mentioned.

As implied by the term "suspended", the nano- or microparticle formulation of the therapeutically active agent forms a discontinuous solid phase in the continuous liquid phase.

Generally, it is preferred that the suspension composition is provided as a two-phase suspension composition with one continuous liquid phase comprising the cryoprotective additive, optionally in combination with further additives dissolved therein, and the nano- or microparticle formulation of the therapeutically active agent suspended as a discontinuous solid phase therein.

The solid composition of the second aspect comprises
(i) a nano- or microparticle formulation of a therapeutically active agent, and
(ii) at least one cryoprotective additive selected from C3-C5 alkanes substituted by one or two hydroxy groups, and is obtainable by freezing the composition according to the first aspect.

The solid composition contains the same components as the suspension composition which can be frozen to obtain the solid composition. Thus, the information regarding suitable and preferred embodiments of the therapeutic agent, of its particle formulation, of the cryoprotective additive, and of the liquid phase and its components provided for the suspension composition continues to apply for the solid composition. However, as will be appreciated by the skilled reader, the solid composition and the suspension composition differ in that the liquid phase of the suspension composition has been solidified in the solid composition. To that extent, the solid composition contains a dispersion of the nano- or microparticle formulation of the therapeutic agent in a solid continuous phase of a frozen liquid. In line with the above, the cyroprotective additive is typically contained in the continuous phase wherein the particle formulation is dispersed.

In view of the above, it will be further apparent that compositions are also preferred as the suspension composition or solid composition in accordance with the invention which comprise (i) a nano- or microparticle formulation wherein the therapeutically active agent is mRNA, and the mRNA is comprised in the particle formulation in the form of a complex with a cationic polymer or oligomer, or in the form a complex with a cationic lipid or a cationic lipidoid, and (ii) 1,2 propanediol as a cryoprotective additive. With regard to suitable and preferred types of the cationic polymer or oligomer, and with regard to the preferred types of cationic lipids and cationic lipidoids, the above considerations continue to apply. Also for these preferred compositions, the particles in the particle formulation typically show an average particle diameter in the range of 1 to 4000 nm, more preferably 2 to 2500 nm, and most preferably 5 to 1000 nm. The upper limit for the diameter of the particles in the nano- or microparticle formulation is preferably 20 μm, more preferably 10 μm, and most preferably 5 μm.

Pharmaceutical Aspects

The suspension composition in accordance with the first aspect of the present invention is suitable to administer the therapeutically active agent contained therein to a subject. As explained above, the composition has the unexpected advantage compared to particle compositions containing other cryoprotectants that it can be kept in a frozen state while the aggregation of the particles during or after freezing is prevented, and while the functionality for administration to or via the respiratory tract, in particular pulmonary administration or nasal administration, is maintained. Therefore, a preferred route of administration for the suspension composition is the administration to or via the respiratory tract, in particular pulmonary administration or nasal administration.

However, it will be appreciated by the skilled reader that the compositions in accordance with the invention can also be administered via other routes of administration which are known in the art for nano- or microparticle formulations of a therapeutically active agent, such as the intravenous administration in the form of a suspension, e.g. to exploit the effect that particle aggregation during or after freezing is prevented by the cryoprotective agent. In this context, it has been found that the presence of the C3-C5 alkane substituted with one or two hydroxy groups may have a beneficial effect on the efficiency of the therapeutic agent, especially if the therapeutic agent is a nucleic acid, preferably RNA, more preferably a single-stranded RNA, and most preferably mRNA, if the suspension composition is administered via alternative routes, such as intravenous administration.

If the therapeutically active agent is a nucleic acid, preferably RNA, more preferably a single-stranded RNA, and most preferably mRNA, the nucleic acid may be delivered to target cells in or via the respiratory tract. The term "delivered to target cells" preferably means transfer of the RNA, preferably single-stranded RNA such as mRNA, into the cell.

The composition can be administered to the subject at a suitable dose. The dosage regimen will be determined by the attending physician and clinical factors. As is well known in the medical arts, dosages for any one subject depend upon many factors, including the subject's size, body surface area, age, the particular compound to be administered, sex, time and route of administration, general health, and other drugs being administered concurrently. A typical dose of therapeutically active substances can be, for example, in the range of 1 ng to several grams. Applied to the preferred case of (m)RNA therapy, the dosage of an (m)RNA for expression or for inhibition of expression should correspond to this range; however, doses below or above this exemplary range are envisioned, especially considering the aforementioned factors. Generally, the regimen as a regular administration of the pharmaceutical composition should be in the range of 0.01 μg to 10 mg units per kilogram of body weight per day. If the regimen is a continuous infusion, it should also be in the range of 1 μg to 10 mg units per kilogram of body weight, respectively. Progress can be monitored by periodic assessment. Dosages will vary but a preferred dosage for administration of (m)RNAs as constituents of the composition of the present invention is from approximately $10^6$ to $10^{19}$ copies of the (m)RNA molecule.

Devices for forming an aerosol from a particulate composition suspended in a liquid or for nebulising such a composition are known in the art and are commercially available. They can be used in order to accomplish the administration of the suspension composition in accordance with the first aspect of the invention to or via the respiratory tract, in particular pulmonary administration. For the administration via the nose, for example a nasal spraying device or nasal infusion may be used.

Thus, one aspect of the present invention relates to a device for forming an aerosol from a particulate composition suspended in a liquid or for nebulising such a composition, which device comprises the suspension composition in accordance with the present invention. The device is preferably an inhaler selected from a metered dose inhaler, a nebulizer, and a nasal spraying device.

Also for the compositions in accordance with the present invention used in the above devices, the information provided above with on preferred embodiments continues to apply. Thus, for example, preferred suspension compositions used in such devices comprise (i) a nano- or microparticle formulation wherein the therapeutically active agent is mRNA, and the mRNA is comprised in the particle formulation in the form of a complex with a cationic polymer or oligomer, or in the form a complex with a cationic lipid or a cationic lipidoid, and (ii) 1,2 propanediol as a cryoprotective additive. With regard to suitable and preferred types of the cationic polymer or oligomer, and with regard to the preferred types of cationic lipids and cationic lipidoids, the above considerations continue to apply. Also for these preferred compositions, the particles in the particle formulation typically show an average particle diameter in the range of 1 to 4000 nm, more preferably 2 to 2500 nm, and most preferably 5 to 1000 nm. The upper limit for the diameter of the particles in the nano- or microparticle formulation is preferably 20 µm, more preferably 10 µm, and most preferably 5 µm.

As explained above, the suspension compositions in accordance with the invention can be conveniently administered after preparation, storage in a frozen state, and recovery by thawing. However, it will be understood that suspension compositions in accordance with the invention can also be administered directly after their preparation, and it has been found that the presence of the C3-C5 alkane substituted with one or two hydroxyl groups may have a beneficial effect on the efficiency of the therapeutic agent, especially if the therapeutic agent is a nucleic acid, preferably RNA, more preferably a single-stranded RNA, and most preferably mRNA, even in a freshly prepared composition.

Thus, the present invention also provides the suspension composition in accordance with the present invention for use in the treatment or prevention of a disease, preferably wherein the composition is to be administered to or via the respiratory tract. More preferably, the composition is to be administered via pulmonary administration or via nasal administration. Patients to which the composition can be administered comprise animals and humans.

Also made available by the present invention is a method of treatment, comprising administering the suspension composition of the present invention to a patient, preferably via administration to or via the respiratory tract, more preferably via pulmonary administration or nasal administration, in order to have the therapeutically active agent contained in said composition cause a preventive or therapeutic effect. Also in this context, the term "patient" comprises animals and humans.

Also for the compositions in accordance with the present invention for use in the treatment or prevention of a disease, the information provided above with on preferred embodiments continues to apply. Thus, for example, preferred suspension compositions for use in the treatment or prevention of a disease, comprise (i) a nano- or microparticle formulation wherein the therapeutically active agent is mRNA, and the mRNA is comprised in the particle formulation in the form of a complex with a cationic polymer or oligomer, or in the form a complex with a cationic lipid or a cationic lipidoid, and (ii) 1,2 propanediol as a cryoprotective additive. With regard to suitable and preferred types of the cationic polymer or oligomer, and with regard to the preferred types of cationic lipids and cationic lipidoids, the above considerations continue to apply. Also for these preferred compositions, the particles in the particle formulation typically show an average particle diameter in the range of 1 to 4000 nm, more preferably 2 to 2500 nm, and most preferably 5 to 1000 nm. The upper limit for the diameter of the particles in the nano- or microparticle formulation is preferably 20 µm, more preferably 10 µm, and most preferably 5 µm.

As noted above, the administration can be accomplished directly after the preparation of the composition, but the effect of the cryoprotective additive is pronounced if the administration is accomplished after the suspension composition had been frozen and thawed at least once.

By administering the suspension composition of the present invention, diseases can be treated or prevented. The term "disease" refers to any conceivable pathological condition that can be treated, prevented or vaccined against by employing the composition of the present invention. Said diseases may e.g. be inherited, acquired, infectious or non-infectious, age-related, cardiovascular, metabolic, intestinal, neoplastic (in particular cancer) or genetic. A disease can be based, for example, on irregularities of physiological processes, molecular processes, biochemical reactions within an organism that in turn can be based, for instance, on the genetic equipment of an organism, on behavioural, social or environmental factors such as the exposure to chemicals or radiation. The suspension composition in accordance with the present invention is particularly suitable for use in the treatment or prevention of a lung disease.

If, in line with a preferred embodiment described above, the therapeutically active agent is RNA, more preferably single stranded RNA, and most preferably mRNA, the suspension composition of the present invention may be for use in an RNA-based therapy. The RNA molecule, preferably the mRNA molecule, comprises a sequence encoding a protein and, accordingly, can be used in RNA-based therapies wherein the RNA, preferably the mRNA, encodes a therapeutically or pharmaceutically active polypeptide or protein having a therapeutic or preventive effect. Thus, in preferred embodiments, the suspension composition of the present invention may be for use in RNA-based therapies in the treatment or prevention of a disease as recited in the following table. Accordingly, RNA-based therapies in accordance with the present invention may be for use in the treatment or prevention of a disease as recited in the following table.

Thus, the suspension composition of the present invention may be for use in RNA-based therapies in cases where the gene defects described in the following table lead to a disease which can then be treated or prevented by a transcript replacement therapy/enzyme replacement therapy with the RNA molecule, preferably the mRNA molecule, of the present invention, wherein the RNA molecule encodes an intact version of the protein or a functional fragment thereof compensating the disclosed defective gene.

In other embodiments, the suspension composition of the present invention may be for use in RNA-based therapies in accordance with the present invention wherein the RNA, preferably the mRNA, encodes a therapeutically or pharmaceutically active polypeptide, protein or peptide having a therapeutic or preventive effect, wherein said polypeptide, protein or peptide is selected from the group encoded by the genes as outlined the following table.

The suspension composition of the present invention is particularly suitable for use in RNA-based therapies in the treatment or prevention of lung diseases. As exemplary diseases, Alpha-1-antitrypsin, Asthma, Cystic fibrosis, Surfactant metabolism dysfunction or Primary ciliary dyskinesia as recited in the following table may be mentioned.

In other exemplary embodiments, the suspension composition of the present invention may be for use in RNA-based therapies in the treatment or prevention of lysosomal diseases like Gaucher disease, Fabry disease, MPS I, MPS II (Hunter syndrome), MPS VI and Glycogen storage diseases such as for example Glycogen storage disease type I (von Gierecke's disease), type II (Pompe's disease), type III (Cori's disease, type IV (Andersen's disease, type V (McArdle's disease, type VI (Hers disease), type VII (Tauri's disease), type VII, type IX, type X, type XI (Fanconi-Bickel syndrome), type XI, or type 0. Transcript replacement therapies/enzyme replacement therapies beneficially do not affect the underlying genetic defect, but increase the concentration of the enzyme in which the patient is deficient. As an example, in Pompe's disease, the transcript replacement therapy/enzyme replacement therapy replaces the deficient Lysosomal enzyme acid alpha-glucosidase (GAA).

In accordance with further examples, RNA-based therapies in accordance with the present invention may be for use in treating cancer, a cardiovascular disease, a viral infection, an immune dysfunction, an autoimmune disease, a neurologic disorder, an inherited metabolic disorders or a genetic disorder or any disease where a protein or protein fragment produced in a cell may have a beneficial effect for the patent. Examples of cancer include head and neck cancer, breast cancer, renal cancer, bladder cancer, lung cancer, prostate cancer, bone cancer, brain cancer, cervical cancer, anal cancer, colon cancer, colorectal cancer, appendix cancer, eye cancer, gastric cancer, leukemia, lymphoma, liver cancer, skin cancer, ovarian cancer, penile cancer, pancreatic cancer, testicular cancer, thyroid cancer, vaginal cancer, vulvar cancer, endometrial cancer, cardiac cancer and sarcoma. Examples of cardiovascular diseases include atherosclerosis, coronary heart disease, pulmonary heart disease and cardiomyopathy. Examples of immune dysfunctions and autoimmune diseases include, but are not limited to, rheumatic diseases, multiple sclerosis and asthma. Examples of viral infections include, but are not limited to, infections with human immunodeficiency virus, herpes simplex virus, human papillomavirus as well as hepatitis B and C virus. Examples of neurologic disorders include, but are not limited to, Parkinson's disease, multiple sclerosis, and dementia. Examples of inherited metabolic disorders include, but are not limited to, Gaucher's disease and Phenylketonuria.

TABLE

Non-limiting examples of human genes and genetic disorders

| Disease | Pathology | Gene, heredity |
|---|---|---|
| Blood diseases | | |
| Fanconi Anemia | Anemia and neutropenia, evidence that a DNA repair mechanism is affected | FANCA, autosomal recessive |
| Hemophilia-A | Abnormal bleeding | Coagulation Factor VIII, X-chromosomal recessive |
| Hemophilia-B | Abnormal bleeding | Coagulation Factor IX, X-chromosomal recessive |
| Hereditary Spherocytosis (various types) | spherical-shaped erythrocytes (spherocytes) | Ankyrin (ANK1) |
| Paroxysmal nocturnal hemoglobinuria | Anemia and presence of blood in the urine | PIG-A, X-chromosomal |
| Porphyria cutanea tarda | Overproduction of heme, iron overload | Uroporphyrinogen decarboxylase (UROD), autosomal recessive |
| Severe combined immune deficiency (SCID) | Due to impaired DNA synthesis severe immune deficiency in humoral and cellular immunity | Adenosine deaminase, autosomal recessive, IL-2R-γ, JAK3, (IL-7R-α, RAG1/2, Artemis, CD3δ, CD3ε |
| Sickle-cell anemia | Abnormal hemoglobin (HbS) | β-Hemoglobin (HB), autosomal recessive |
| Thalassemia (α- and β form) | Lack of α- or β hemoglobin resulting in anemia | Deletion of HBA1 and/or HBA2, |
| Von Willebrand disease (three types known, Type-III is most severe) | Abnormal bleeding, hemorrhage similar to hemophilia A and B | Autosomal dominant and recessive forms |
| Cancer | | |
| Malignant melanoma | P16 mutation leads to uncontrolled proliferation of fibroblasts | Cyclic dependant kinase inhibitor 2 (CDKN2) |
| Neurofibromatosis (2 types) | Benign tumors on auditory nerves leads to deafness | NF1, NF2, autosomal dominant |
| Deafness (Ear) | | |
| Deafness | Hearing loss | Deafness-1A (DFNB1), autosomal recessive |
| Pendred syndrome | Hearing loss | Pendrin (PDS), autosomal recessive |

TABLE-continued

Non-limiting examples of human genes and genetic disorders

| Disease | Pathology | Gene, heredity |
|---|---|---|
| Heart | | |
| Ataxia telangiectasia | DNA damage repair disturbed, | ATM, |
| Atherosclerosis | Increase of blood cholesterol | apoE, |
| LQT Syndrome (Long QT) | Potassium channel defect | LQT1 and other genes |
| Von-Hippel Lindau Syndrome | Abnormal growth of blood vessels, can lead to cancer | VHL, autosomal dominant |
| William's Beuren Syndrome | Deletion of elastin results in vascular defects, supravalvular aortic stenosis | Deletion of elastin and LIM kinase genes |
| Metabolic disorders and glycogen storage diseases | | |
| Adrenoleukodystrophy | Disturbed fatty acid transport and metabolism | ABCD1, X-chromosomal |
| Alkaptonuria | Nitrogen metabolism defect, Urine turns dark when exposed to oxygen | Homogentisic Oxidase, autosomal recessive |
| Diabetes type I | Disturbed insulin production | IDDM1, IDDM2, GCK, . . . |
| Galactosemia | disorder of galactose metabolism | Galactose-1-phosphate uridyltransferase gene (GALT), autosomal recessive |
| Gauche disease | Disturbance of fat metabolism | Glucocerebrosidase |
| Glucose Galactosidase Malabsorption | Disturbed glucose and galactose transport out of the intestinal lumen resulting in diarrhea | SGLT1, autosomal recessive |
| Glycogen storage disease Type I, Von-Gierke's disease | Accumulation of glucose in liver and kidney | Glucose-6-Phosphatase, autosomal recessive |
| Glycogen storage disease Type II, Pompe's disease | Accumulation of glycogen in liver, heart, skeletal muscle, cardiomegaly | α-1-Glucosidase, autosomal recessive |
| Glycogen storage disease Type III, Cori's disease | Accumulation of glycogen in liver, heart, skeletal muscle, hepatoomegaly | Debranching enzyme, autosomal recessive |
| Glycogen storage disease Type V, McArdle's disease | Cannot untilize glycogen in muscle cells | Muscle phosphorylase, autosomal recessive |
| Glucose-6-Phosphate Dehydrogenase | Inability to maintain glutathione leads to hemolytic anemia | G6PD, X-chromosomal recessive |
| Hereditary Hemochromatosis (4 types) | Excess of iron in the body (esp. liver) due to excessive iron absorption in the gut | Hemochromatosis (HFE) |
| Homocystinuria | Nitrogen metabolism defect | Cystathione synthetase defect, autosomal recessive |
| Lesh Nyhan Syndrome | Accumulation of uric acid leading to gout, ureate stones and muscle loss | HPRT1, X-chromosomal |
| Maple Syrup Urine Disease | Amino acid metabolism defect leads to the accumulation of α-Ketoacides and death in the first months if untreated | Branched-chain-alpha-dehydrogenase (BCKDH) |
| Menkes' Syndrome | Reduced ability to absorb copper, leads to death in infancy if untreated | ATP7A, X-chromosomal recessive |
| Obesity | Elevated body weight | Polygenic, elevated leptin levels may play a role |

TABLE-continued

Non-limiting examples of human genes and genetic disorders

| Disease | Pathology | Gene, heredity |
|---|---|---|
| Phenylketonuria | Inability to break down Phenylalanine into tyrosine leads to mental retardation | Phenylalanine hydroxylase (PAH), autosomal recessive |
| Tangier disease | reduced levels of plasma high density lipoproteins | ATP-binding cassette-1 gene (ABCA1) |
| Zellweger Syndrome (leads to death in infants) | High levels of iron and copper in the blood | PXR1 (receptor on the surface of peroxisomes) |
| Wilsons Disease | Copper accumulation in brain and liver | ATP7B (P-type ATPase), autosomal recessive |
| Musculoskeletal system | | |
| Achondroplasis | Short stature with a large head due to slow proliferation of chondrocytes | Fibroblast growth factor receptor 3 (FGF3R), |
| Charcot-Marie-Tooth Syndrome and its more severe form Dejerine-Sottas Syndrome | Degeneration of the muscles in limbs | Different forms caused by different gene mutations, autosomal recessive and X-chromosomal |
| Cockayne syndrome (2 types) | Premature aging and short stature, loss of "on the fly" DNA repair | group 8 excision repair cross-complementing protein (ERCC8) |
| Chondroectodermal dysplasia | Malformation of bones and polydactyly | EVC, autosomal recessive |
| Diastrophic dysplasia (DTD) | Malformed hands, sulfate transporter defect | DTDST gene |
| Duchenne muscular dystrophy | Enlargement of muscle tissue with subsequent loss of function | DMD, X-chromosomal recessive |
| Fibrodysplasia Ossificans Progressiva | Heterotopic bone formation | NOG, BMP, Autosomal dominant |
| Friedreich's ataxia | Heart enlargement and progressive loss of muscular coordination | Frataxin, autosomal recessive |
| Hypophosphatasia | Production of an abnormal version of alkaline phosphatase affecting the mineralization process | ALPL, autosomal recessive |
| Marfan Syndrome | Connective tissue disorder due fibrillin deficiency | Fibrillin 1 (FBN), autosomal dominant |
| Myotonic dystrophy (onset during young adulthood) | Protein kinase defect in skeletal muscle cells | Dystrophia myotonica protein kinase (DMPK), autosomal dominant |
| Osteogenesis imperfect (various types) | Defect in type-I collagen formation leads to multiple fractures after birth | COL1A1, COL1A2 |
| Prader-Willi Syndrome | Decreased muscle tone and mental retardation | SNRPN (small ribinucleoprotein N) deleted due to a deletion on chromosome 15 |
| Neurons and Brain | | |
| Alzheimer disease | Increased amyloid production, progressive inability to remember facts | Polygenic, PS1, PS2, . . . |
| Amyotrophic lateral sclerosis (ALS) (various forms) | Progressive degeneration of motor neuron cells (defect in elimination superoxide radicals) | Superoxide dismutase 1 (SOD1), various genes involved |
| Angelman syndrome | Mental retardation with inadequate laughing | Genomic imprinting on chromosome 15 |
| Pyruvat dehydrogenase | Neurological defects if untreated | Pyruvat dehydrogenase, autosomal recessive |
| Refsum disease | Accumulation of phytanic acid leads to peripheral neuropathy | Phytanoyl-CoA hydroxylase (PHYH), autosomal recessive |

TABLE-continued

Non-limiting examples of human genes and genetic disorders

| Disease | Pathology | Gene, heredity |
|---|---|---|
| Rett's syndrome | Mental retardation with arrested development between 6 and 18 months of age | Methyl-CpG-binding protein-2 (MECP2), X-chromosomal dominant |
| Tay-Sachs disease (various forms of severity) | Disturbed break down of GM2 ganglioside leads to neurological damage | HEXA (β-hexosaminidas A), autosomal recessive |
| LaFora Disease | Aggressive form of epilepsy | EPM2A, autosomal recessive |
| Essential tremor (variable forms) | Uncontrollable shaking | ETM1, ETM2, autosomal dominant |
| Fragile X syndrome | Lack of FMR1 RNA binding protein, mental retardation | FMR1 gene is not expressed due to an CGG amplification in the 5'UTR region |
| Huntington's disease | Progressive dementia with onset in adulthood | HTT (huntingtin), autosomal dominant |
| Intestine | | |
| Bartter's syndrome (3 types) | Renal disease | Kidney chloride channel B gene (CLCNKB), autosomal recessive |
| Polycystic kidney disease (2 types) | renal disease | PDK1, PDK2, autosomal dominant, there is also a autosomal recessive form known (ARPKD) |
| Lung | | |
| Alpha-1-antitrypsin | Defect alveoli due to uncontrolled release of elastase | SERPINA1, autosomal codominant |
| Asthma | Chronic inflammatory disorder of the airways | Polygenic |
| Cystic fibrosis | Excessively viscous mucous due to defective Cl$^-$ ion transport | CFTR (cystic fibrosis conductance transmembrane regulator), autosomal recessive |
| Surfactant metabolism dysfunction (various types) | Newborns are of normal body weight, but all fail to inflate | ATP-binding cassette transporter (ABCA3) |
| Primary ciliary dyskinesia | Excessively viscous mucous due to defective/missing cilia function | DNAI1, CCNO, CCDC40 among others |
| Lysosomal storage diseases | | |
| Fabry's disease | Beyond others, skin lesions due to the accumulation of ceramide trihexoside | α-Galactosidase A, X-chromosomal recessive |
| Gaucher's Disease Type-I: adult form (normal lifespan under treatment) Type-II: infantile form (death before age 1) Type-III: juvenile form (onset in early childhood, less severe than Type-II) | Accumulation of glucocerebrosides (gangliosides, sphingolipids) | Glucocerebrosidase, autosomal recessive, |
| Hunter's Syndrome | Accumulation of mucopolysaccharides | L-iduronosulfat sulfatase, X-chromosomal recessive |
| Hurler's Syndrome (death by age of 10) | Accumulation of mucopolysaccharides | α-L-iduronidase, autosomal recessive |
| Niemann-Pick Disease (three distinct forms A, B, C) | Defect in releasing Cholesterol from lysosomes, accumulation of Sphingomyelin | Sphingomyelinase, autosomal recessive |
| Tay-Sachs disease (death by age of 4) | Accumulation of $G_{M2}$ ganglioside in neuronal cells | Hexosaminidase A, autosomal recessive |

TABLE-continued

Non-limiting examples of human genes and genetic disorders

| Disease | Pathology | Gene, heredity |
| --- | --- | --- |
| Skin | | |
| Albinism | Nitrogen metabolism defect | Tyrosinase deficiency, autosomal recessive |
| Albinism, oculocutaneous, type II | Reduced biosynthesis of melanin pigment | OCA2, autosomal recessive |
| Ehlers-Danlos Syndrome (various types) | Diaphragmatic hernia. common, retinal detachment | Various defects in collagen synthesis |
| Epidermolysis bullosa (various types including EB simplex, Junctional EB, Dystrophic EB and Kindler syndrome) | Defects in maintenance of keratinocyte structural stability or adhesion of the keratinocyte to the underlying dermis | Epidermolysis bullosa macular type (EBM), Epidermolysis bullosa 3 progressiva (EBR3), Epidermolysis bullosa 4 pseudojunctual (EBR4), Desmoplakin (DSP), Plakophilin-1 (PKP1), kreatin (KRT5, KRT14), plectin (PLEC), ITGA6, integrin subunit (ITGB4), laminin subunits (LAMA3, LAMP3, LAMB3, LAMC2), collagen (COL17A1, COL7A1 (autosomal dominant), FERMT1, autosomal recessive |
| Hartnup's disease | Defect in tryptophan uptake in the gastrointestinal tract, light-sensitive skin | SLC6A19, autosomal recessive |
| Hereditary Hemorrhagic Telangiectasia, Osler-Weber-Rendu Syndrome | Telangiectasia of the skin and mucous membranes | Endoglin (ENG), autosomal dominant |
| Hypercholesterolemia, familial | elevation of serum cholesterol bound to low density lipoprotein, accumulation in skin and arteriosclerosis | Low-density lipoprotein receptor (LDLR), apolipoprotein B (APOB), autosomal dominant |
| Xeroderma pigmentosa | skin defect and melanoma due to UV exposure | DNA repair defect, autosomal recessive |
| Male pattern baldness | Disturbed conversion of testosterone into dihydrotestosterone in the skin | 5-α-reductase |
| Genetic liver diseases | | |
| Amino acid metabolism disorders | Disruptions in the multistep process that breaks down the amino acid tyrosine and phenylalanine | FAH, TAT, HPD, autosomal recessive |
| Beta-thalassemia intermedia | Shortage of mature red blood cells | HBB, autosomal recessive |
| Crigler-Najjar syndrome | Deficiency in glucuronidation in which bilirubin gets dissolvable in water | UGT1A1, autosomal recessive |
| Fatty acid oxidation disorders | Deficiency in processing of long-chain fatty acids and very long-chain fatty acids resulting in lethargy and hypoglycemia | HADHA, ACADVL autosomal recessive |
| Fructose metabolism disorders | Impaired gluconeogenesis causing hypoglycemia | FBP1, ALDOB, autosomal recessive |
| Galactosemia | Deficiency in processing galactose | GALT, GALK1, GALE, autosomal recessive |

TABLE-continued

Non-limiting examples of human genes and genetic disorders

| Disease | Pathology | Gene, heredity |
|---|---|---|
| Glycogen storage diseases | Disturbed breackdown of glucose 6-phosphate and glycogen leads to accumulation of glycogen as well as abnormal glycogen molecules causing cell damage | G6PC, SLC37A4, AGL, GBE1, autosomal recessive |
| Heme biosynthesis disorder | Decrease of uroporphyrinogen decarboxylase resulting in accumulation of compounds called porphyrins causing toxic levels in liver | UROD autosomal dominant, ALAS2 X-limked dominant, ALAD autosomal recessive |
| Lipid metabolism (transport) disorders | Shortage of functional protein, which prevents movement of cholesterol and other lipids, leading to their accumulation in cells | NPC1, NPC2 autosomal recessive, LDLR, autosomal dominant |
| Metal metabolism disorders | Disorders in the storage and transport of iron and copper resulting in accumulation in tissues and organs | ATP7B, HAMP, HFE, HFE2, autosomal recessive |
| Organic acid disorders (Acidurias/Acidemias) | Disrupted break down of several protein building blocks (amino acids), certain lipids, and cholesterol | BCKDHA, BCKDHB, and DBT, PCCA and PCCB, MUT, MMAA, MMAB, MMADHC, MCEE, IVD, MCCC1 or MCCC2, autosomal recessive |
| Primary hyperoxaluria type 1 | Disrupted breakdown of glyoxylate leading to renal damage | AGXT, GRHPR, autosomal recessive |
| Progressive familial intrahepatic cholestasis | Buildup of bile acids in liver cells causing liver damage | ATP8B1, autosomal recessive |
| Thrombocyte activity disorder | Lack of enzyme activity disrupts the usual balance between bleeding and clotting | ADAMTS13, autosomal recessive |
| Urea cycle disorders | Disorder of the urea cycle which causes a form of hyperammonemia | OTC (X-linked disorder), CPS1, ASS1 and SLC25A13, ASL, autosomal recessive |

Processes for Preparation

A further aspect of the invention relates to a process for the preparation of a composition in accordance with the above first aspect, said process comprising
  a) providing a nano- or microparticle formulation of a therapeutically active agent, which comprises is suspended in a liquid phase, and
  b) adding least one cryoprotective additive selected from C3-C5 alkanes substituted by one or two hydroxy groups to the liquid phase, wherein the addition of the cryoprotective additive to the liquid phase may be accomplished prior to, during or after providing the particle formulation suspended in the liquid phase.

As regards the provision of a particle formulation of a therapeutically active agent which comprises nano- or microparticles, techniques are established in the art.

As regards processes for the provision of particle formulations of nucleic acid as a therapeutic agent, preferably RNA, more preferably single stranded RNA, and preferably mRNA, reference can again be made to the literature discussed above, such as A. C. Silva et al., Current Drug Metabolism, 16, 2015, 3-16, and the literature referred to therein, J. C. Kasper et al., J. Contr. Rel. 151 (2011), 246-255, WO 2014/207231 and the literature referred to therein, WO 2016/097377 and in the literature referred to therein, US 2017/0267631, WO 2016/081029, WO 2011/071860, WO 2016/118697, U.S. Pat. No. 8,450,298 B2, and E. R. Lee et al., Human Gene Therapy 7:1701-1717, Sep. 10, 1996.

Preferred particle formulations containing nucleic acid, preferably RNA, more preferably single stranded RNA, and most preferably mRNA as an active agent in the form of a complex with a cationic polymer, oligomer, lipid or lipidoid, such as polyplexes, lipoplexes, liposomes or LNPs can be conveniently formed making use of a self assembly of a negatively charged nucleic acid with a positively charged oligomer, polymer, lipid or lipidoid.

The self-assembly may occur upon mixing the solutions of the components. Self-assembly can be accomplished e.g. by hand mixing using pipetting and shaking/vortexing or using an automated device for micro-mixing such as described for example by Hirota et al. (Hirota et al. 1999, Biotechniques, 27, 286-290) or Kasper et al. (Kasper et al. 2011, Eur J Pharm Biopharm, 77, 182-185) or by microfluidic focussing such as reviewed by Xuan et al. (Xuan et al. 2010, Microfluidics and Nanofluidics, 9, 1-16). In order to incorporate further components in addition to the nucleic acid and the oligomer, polymer, lipid or lipidoid to be incorporated into the particles of the particle formulation, sequential mixing can be used. In this case, any further component may be added after self-assembly of the oligomer, polymer, lipid or lipidoid and the nucleic acid, or it may be added to either of these before mixing.

For example, the formation of polyplexes can be conveniently achieved by mixing a solution containing the nucleic acid in water and a solution containing the cationic polymer or oligomer in water.

Also for the formation of liposomes, established techniques are available. They include, e.g., the rehydration of lipid or lipidoid components, such as lipid or lipidoid films, followed by homogenization techniques like e.g. ultra sonication or extrusion, where required. Alternative approaches are infusion of lipid or lipidoid component dissolved in organic solvents into water or an aqueous solution.

As an exemplary method which can be relied on for the formation of lipid nanoparticles or lipoplexes is the solvent displacement method can be mentioned.

Particles relying on a viral vector can be provided by known biological methods.

As further examples for the preparation of a particle formulation, the particles comprising a therapeutically active agent can be formed by emulsification of a solution containing the active agent, optionally in combination with a matrix forming agent, followed by solidifying the particles. The solidification can be accomplished, e.g., by removing a solvent from an emulsified oil phase wherein a matrix forming material is contained, or by crosslinking or polymerizing components for the formation of a matrix. Also the materials and methods for the formation of liposomal formulations are known to the skilled practitioner.

The cryoprotective additive may be conveniently added to the liquid phase wherein the nano- or microparticle formulation is suspended or wherein the suspension is to be provided. In other words, the addition of the cryoprotective additive to the liquid phase may be accomplished prior to, during or after providing the particle formulation suspended in the liquid phase.

The solid composition in accordance with the second aspect of the present invention can be prepared by a process, comprising:
  a first step of preparing a composition in accordance with the above first aspect by a process comprising
    a) providing a nano- or microparticle formulation of a therapeutically active agent which is suspended in a liquid phase, and
    b) adding least one cryoprotective additive selected from C3-C5 alkanes substituted by one or two hydroxy groups to the liquid phase, wherein the addition of the cryoprotective additive to the liquid phase may be accomplished prior to, during or after providing the particle formulation suspended in the liquid phase,
  and a second step of freezing the composition obtained in the first step.

As regards the first step, it will be understood that the information which is provided above with regard to the preparation of the suspension composition equally applies for the preparation of the solid composition.

The freezing step as a second step is typically accomplished by subjecting the suspension composition to sufficiently cold temperatures (e.g. −10° C. or less, preferably −20° C. or less) in a suitable container. As a cooling medium, e.g. cold air or cold liquids may be used.

Incidentally, as explained above, the solid composition in accordance with the second aspect of the invention is a composition which allows a particle formulation of a therapeutically active agent containing nanoparticles or microparticles to be stored. To that extent, it will be understood that a suspension composition in accordance with the first aspect of the invention can also be recovered from the solid composition in accordance with the second aspect of the invention by thawing the solid composition.

Thus, as a further aspect, the present invention also provides a process for the preparation of a composition in accordance with the above first aspect, said process comprising:
  a first step of preparing a composition in accordance with the above first aspect by a process comprising
    a) providing a nano- or microparticle formulation of a therapeutically active agent which is suspended in a liquid phase, and
    b) adding least one cryoprotective additive selected from C3-C5 alkanes substituted by one or two hydroxy groups to the liquid phase, wherein the addition of the cryoprotective additive to the liquid phase may be accomplished prior to, during or after providing the particle formulation suspended in the liquid phase,
  a second step of freezing the composition obtained in the first step,
  and a third step of thawing the frozen composition obtained in the second step.

Methods and Uses

Furthermore, the invention provides a method of preserving a nano- or microparticle formulation of a therapeutically active agent, which method comprises providing a composition in accordance with the above first aspect of the invention, i.e. a composition comprising
  (i) a nano- or microparticle formulation of a therapeutically active agent which is suspended in a liquid phase, and
  (ii) at least one cryoprotective additive selected from C3-C5 alkanes substituted by one or two hydroxy groups,
  and freezing the composition.

Also with regard to this aspect of the invention, the information provided above regarding suitable and preferred embodiments of the therapeutic agent, of its particle formulation, of the cryoprotective additive, on the liquid phase, on the processes available to provide the composition, and on the freezing step, continues to apply.

As will be understood by the skilled reader, the term "preservation" indicates in this context that the relevant therapeutic characteristics of the particle formulation of the therapeutically active agent are retained to a substantial degree, preferably fully retained, during its storage. The method of preserving the particle formulation typically further involves the storage of the frozen composition while retaining it in its frozen state over a desired period of time, e.g. over several hours, days, weeks, months or even years.

As yet another aspect, the invention provides the use of a compound selected from C3-C5 alkanes substituted by one or two hydroxy groups as a cryoprotective additive for a composition comprising a nano- or microparticle formulation of a therapeutically active agent.

Also with regard to this aspect of the invention, the information provided above regarding suitable and preferred embodiments of the therapeutic agent, of its particle formulation, and of the cryoprotective additive continues to apply.

As will be appreciated, the use as a cryoprotective additive involves the combination of the compound selected from C3-C5 alkanes substituted by one or two hydroxy groups with the particle formulation of a therapeutically active agent, in a composition. The composition in which the two components are combined is the composition in accordance with the first aspect of the invention. The use further involves freezing the composition, so that the compound selected from C3-C5 alkanes substituted by one or two hydroxy groups can act as a cryoprotectant, i.e. it can protect the particles of the particle composition and can ensure in particular that their functionality for application to or via the respiratory tract is maintained to a significant degree, preferably fully maintained.

A summary of important aspects of the invention is provided in the following items. It will be understood that these items form a part of the general disclosure of the present invention, such that the information provided in the preceding part of the specification, e.g. with regard to further preferred embodiments or optional features, also applies for the following items.

1. A composition comprising
   (i) a nano- or microparticle formulation of a therapeutically active agent which is suspended in a liquid phase, and
   (ii) at least one cryoprotective additive selected from C3-C5 alkanes substituted by one or two hydroxy groups.
2. The composition according to item 1, wherein the therapeutically active agent is a nucleic acid.
3. The composition according to item 2, wherein the nucleic acid is RNA.
4. The composition according to item 3, wherein the RNA is mRNA.
5. The composition according to any of items 1 to 4, wherein the nano- or microparticle formulation shows an average particle diameter in the range of 1 to 4000 nm, more preferably 2 to 2500 nm, and most preferably 5 to 1000 nm.
6. The composition according to any of items 1 to 5, wherein the particles in the nano- or microparticle formulation have a maximum particle diameter of 20 µm, more preferably 10 µm, and most preferably 5 µm.
7. The composition according to any of items 1 to 6, wherein the nano- or microparticle formulation has an active load, expressed as the weight of the therapeutically active agent to the total weight of the particles in the particle formulation, in the range of 0.1 to 95%, more preferably 0.5 to 90%, most preferably 1 to 80%.
8. The composition according to any of items 2 to 7, wherein the therapeutically active agent is a nucleic acid and the particles of the nano- or microparticle formulation comprise the nucleic acid and a cationic excipient.
9. The composition according to item 8, wherein the particles of the particle formulation comprise the nucleic acid in the form of a complex formed by the nucleic acid and a cationic oligomer or a cationic polymer as the cationic excipient.
10. The composition according to item 9, wherein the complex is formed by the nucleic acid and a cationic oligomer or polymer comprising a plurality of units wherein an amino group is contained.
11. The composition according to item 10, wherein the N/P ratio of the number of amine nitrogen atoms N in the cationic oligomer or polymer to the number of phosphate groups P in the nucleic acid is in the range of 1 to 100, more preferably 2 to 80, and most preferably 3 to 60.
12. The composition according to item 10 or 11, wherein the cationic polymer comprises a plurality of units independently selected from the following (1), (2), (3) and (4):

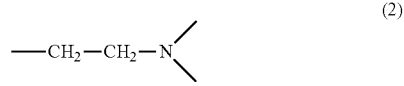
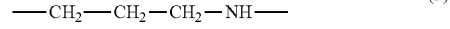
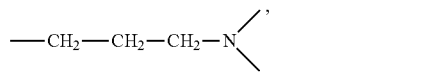

and wherein one or more of the nitrogen atoms of the repeating units (1), (2), (3) and/or (4) may be protonated to provide the cationic charge of the polymer.
13. The composition according to item 8, wherein the particles of the particle formulation comprise the nucleic acid in the form of a complex formed by the nucleic acid and a cationic lipid or a cationic lipidoid as the cationic excipient.
14. The composition according to item 13, wherein particles of the particle formulation comprise lipoplexes, liposomes, or lipid nanoparticles.
15. The composition of item 13 or 14, wherein the particles of the particle formulation further comprise one or more helper lipids selected from sterols, neutral lipids, sphingolipids and pegylated lipids.
16. The composition of any of items 13 to 15, wherein the ratio of the total weight of lipids and lipidoids to the weight of the nucleic acid is in the range of 0.1 to 200, more preferably 0.2 to 150, most preferably 0.5 to 100.
17. The composition according to any of items 1 to 16, wherein the cryoprotective additive comprises at least a secondary hydroxy group.
18. The composition according to item 17, wherein the cryoprotective additive is selected from 1,2-propanediol, 2-propanol, 1,2-butanediol, and 1,3-butanediol.
19. The composition according to item 17, wherein the cryoprotective additive is 1,2-propanediol.
20. The composition according to any of items 1 to 19, wherein the cryoprotective additive is contained at a concentration of 0.5 to 50% w/v, more preferably 1 to 40% w/v, and most preferably 1 to 30% w/v, based on the volume of the liquid phase.
21. The composition according to any of items 1 to 20, which comprises the particles of the nano- or microparticle formulation in an amount so as to provide the therapeutically active agent, which is contained in the particle formulation, at a concentration of 0.01 to 50 mg/ml, more preferably 0.02 to 30 mg/ml, based on the total volume of the composition.
22. The composition according to any of items 1 to 21, wherein water and the cryoprotective additive are the only solvents contained in the liquid phase.
23. A solid composition comprising
   (i) a nano- or microparticle formulation of a therapeutically active agent, and (ii) at least one cryoprotective additive selected from C3-C5 alkanes substituted by one or two hydroxy groups,
which is obtainable by freezing the composition according to any of items 1 to 22.

24. A process for the preparation of a composition in accordance with any of items 1 to 22, said process comprising
a) providing a nano- or microparticle formulation of a therapeutically active agent which is suspended in a liquid phase, and
b) adding least one cryoprotective additive selected from C3-C5 alkanes substituted by one or two hydroxy groups to the liquid phase, wherein the addition of the cryoprotective additive to the liquid phase may be accomplished prior to, during or after providing the particle formulation suspended in the liquid phase.

25. A process for the preparation of the solid composition in accordance with item 23, said process comprising:
a first step of preparing a composition in accordance with the above first aspect by a process comprising
a) providing a nano- or microparticle formulation of a therapeutically active agent which is suspended in a liquid phase, and
b) adding least one cryoprotective additive selected from C3-C5 alkanes substituted by one or two hydroxy groups to the liquid phase, wherein the addition of the cryoprotective additive to the liquid phase may be accomplished prior to, during or after providing the particle formulation suspended in the liquid phase,
and a second step of freezing the composition obtained in the first step.

26. A method of preserving a nano- or microparticle formulation of a therapeutically active agent, said method comprising providing a suspension composition in accordance with any of items 1 to 22, and freezing the composition.

27. Use of a compound selected from C3-C5 alkanes substituted by one or two hydroxy groups as a cryoprotective additive for a composition comprising a nano- or microparticle formulation of a therapeutically active agent.

28. A device for forming an aerosol from a particulate composition suspended in a liquid or for nebulising such a composition, which device comprises the composition in accordance with any of items 1 to 22.

29. The device in accordance with item 28, wherein the device is an inhaler selected from a metered dose inhaler, a nebulizer, and a nasal spraying device.

30. A method of treatment, comprising administering the composition in accordance with any of items 1 to 22 to a patient, preferably via administration to or via the respiratory tract, more preferably via pulmonary administration or nasal administration.

31. The composition in accordance with any of items 1 to 22 for use in the treatment or prevention of a disease, wherein the composition is to be administered to or via the respiratory tract.

32. The composition for use in accordance with item 31, wherein the composition is to be administered via pulmonary administration or via nasal administration.

33. The composition in accordance with item 31 or 32, wherein the therapeutically active agent is RNA, more preferably mRNA, for use in the treatment or prevention of a disease via an RNA-based therapy.

34. The composition for use in accordance with any of items 31 to 33, wherein the disease to be treated or prevented is a lung disease.

EXAMPLES

Abbreviations

| Abbreviation | Description |
| --- | --- |
| RT | Room temperature |
| mRNA | Messenger ribonucleic acid |
| brPEI | Branched polyethyleneimine |
| FLuc | Firefly luciferase |
| w/o | without |
| cmRNA | chemically modified ribonucleic acid |
| FLuc | Firefly luciferase |
| PG | 1,2-propanediol, propylene glycol |
| N/P | Carrier amine nitrogen to mRNA phosphate ratio |

Example I: Screening Different Classes of Molecules as Cryoprotective Additives for Nano- or Microparticle Formulations Complex Formation Complexes of branched poly(ethylenimine) (brPEI) and mRNA encoding for luciferase were formed at a final concentration of 0.25 mg/mL. In a standard mixing process, mRNA was diluted with water to a concentration of 0.5 mg/mL. The same volume of brPEI solution was prepared at a concentration of 0.65 mg/mL in water. Nano- or microparticles were formed by injection of the mRNA solution into the brPEI solution followed by mixing using an electronic pipette (Mettler-Toledo, E4 LTS 1000 µL). After mixing, the complexes were incubated for 20 min on ice before use.

Size Measurement

For the determination of the particle diameter, 100 µL of a suspension of the particles was filled into a cuvette (Brand, UV-cuvette Micro) and measured using a Malvern ZetaSizer Nano ZS (Malvern Instruments) giving the hydrodynamic diameters and the average hydrodynamic diameter (z-average) in nm. As a suspension medium, water or water containing a cryoprotective additive, as indicated, was used.

Freeze-Thaw Challenge

The formulation was diluted 1:2 with 2× (20/10/2%) additive solutions (Table 1) and split in duplicates. One sample of each resulting formulation was used for size determination (Malvern Zetasizer NanoZS) in the presence of additive. The remaining samples were frozen at −20° C. for 16 h, thawed at RT and immediately stored on ice before the solutions reached RT. Each thawed formulation was then used for size determination (Malvern Zetasizer NanoZS) and compared regarding the % size deviation of formulations before freezing and after thawing according to the following equation, wherein $d_h$ indicates the z-average particle diameter:

$$\text{size deviation}[\%] = \left(\frac{d_h(\text{after freezing})}{d_h(\text{before freezing})} - 1\right) * 100\%$$

Transfection and Luciferase Activity Assay

A549 cells were cultured in MEM medium supplemented with 10% fetal bovine serum (FBS) and 1% penicillin/streptomycin (P/S) at 37° C., 5% $CO_2$. Cells were seeded at 20000 cells/well in 100 µL medium in a 96-well plate 24 h prior to transfection. At the day of transfection medium was replaced with MEM without FBS and penicillin/streptomycin followed by addition of complexed mRNA in 60 µL/well in duplicates. 4 h after transfection, medium was replaced with MEM with 10%, FBS and 1% P/S. The plates were incubated for 24 h at 37° C. and 5% $CO_2$. After 24 h of incubation, medium was removed and cells were lysed in 100 µL lysis buffer (25 mM Tris HCl, 0.1% TritonX-100, pH 7.8) and incubated on a plate shaker for 30 min at 600 rpm. Next, 50 µL cell lysate from each well was transferred to a 96-well plate and the activity of reporter firefly luciferase was measured by bioluminescence intensity on a Tecan Infinite 200 PRO after addition of luciferin buffer (0.47 mM D-luciferin, 0.27 mM Coenzyme A, 3.33 mM DTT, 0.53 mM ATP, 1.1 mM $MgCO_3$, 2.7 mM $MgSO_4$, 20 mM Tricine, 0.1 mM EDTA).

Sample Preparation for In Vivo Experiments

Complexes were prepared as described under "complex formation" and "freeze-thaw challenge" with the following modification. 4 mL of complex solution was prepared at an mRNA concentration of 0.5 mg/mL and diluted 1:2 with a double concentrated additive solution to result in a final mRNA concentration of 0.25 mg/mL (8 mL). Samples were kept frozen until nebulization to animals.

Nebulization

Animals were placed in a Buxco Small Size Mass Dosing Chamber (Data Sciences International, Germany). The formulations were thawed at RT, placed on crushed ice before reaching RT and then nebulized using an Aeroneb Solo Nebulizer (Aeroneb, Germany) at an air circulation rate 3 L/min and a duty cycle of 100%.

Bioluminescence Measurement in Explanted Lungs 24 h after application, animals were set under full anesthesia through intraperitoneal injection of Fentanyl/Midazolam/Medetomidin (0.05/5.0/0.5 mg/kg BW). 50 µL D-Luciferin (30 mg/mL dissolved in phosphate buffered saline, pH 7) were applied via the sniffing route (inhalation of solution after it was directly applied to the nostrils) and 100 µL D-Luciferin were applied systemically by intraperitoneal injection. At 10 min post Luciferin administration, mice were euthanized via cervical dislocation. After perfusion with PBS via the right heart lungs were explanted. Bioluminescence was measured using a Xenogen IVIS Luminar XR (Caliper LifeSciences) with a binning Set to 8 and an exposure time of 5 min. Bioluminescence was quantified and analyzed using Living Image Software 4.4 (Xenogen). In case of oversaturated pictures (detection of expression out of linear range), exposure time was reduced to 1 min. Bioluminescence was measured as total flux pewr organ (in photons/sec). Only pictures without oversaturation were used for analysis. Lungs were snap frozen and stored at −80° C.

Luciferase Activity in Homogenized Lungs

Thawed organs were weighed and one half of explanted lungs was homogenized in lysis buffer using a FastPrep®-24 Homogenisator (MP Biomedicals). 100 µL luciferin buffer was added automatically by the Lumat LB 9507 Luminometer (Berthold Technologies) to 75 µL of centrifuged lysates. Luciferase activity was measured in RLU/s and converted to RLU/organ.

Results

The ability to prevent particle aggregation of polymer/mRNA formulations after one freeze-thaw cycle was shown for different types of additives, including compounds established as cryoprotective additives in the art. The composition using 1,2-propanediol is a composition in accordance with the invention, the other compositions are reference compositions. Hydrodynamic particle diameters were evaluated before freezing. After 16 h at −20° C., formulations were thawed and the hydrodynamic particle diameter was measured again. Size differences between particles before freezing and after thawing are displayed in Table 1 b. High numbers indicate a huge increase in size and thus aggregation.

TABLE 1a

Standard size of a freshly prepared complex in water measured with the ZetaSizer Nano ZS (Malvern)

| Carrier | Hydrodynamic diameter (z-average [nm]) |
|---|---|
| brPEI, N/P 10 | 122.6 |

TABLE 1b

Particle size deviation after one freeze-thaw cycle compared to fresh complexes at different types and concentrations of additives.

| Class | Additive | Additive concentration [% w/v] | Size difference [%] |
|---|---|---|---|
| n/a | w/o | 0 | 1121 |
| Disaccharides | D-(+)-Trehalose dihydrate* | 10 | −6 |
| | | 5 | 3 |
| | | 1 | 659 |
| | Sucrose* | 10 | −10 |
| | | 5 | 0 |
| | | 1 | 1608 |
| | α-Lactose monohydrate* | 2.5 | 14 |
| | | 1 | 17 |
| | | 0.25 | 1059 |
| Oligosaccharides | Dextran from Leconostoc spp.* | 10 | −48 |
| | | 5 | 52 |
| | | 1 | 469 |
| | (2-Hydroxypropyl)-β-cyclo-dextrin* | 10 | 12 |
| | | 5 | 30 |
| | | 1 | 135 |
| Alkanols | Glycerol* | 10 | 2 |
| | | 5 | −5 |
| | | 1 | 836 |
| | 1,2-Propanediol | 10 | 3 |
| | | 5 | 10 |
| | | 1 | 28 |
| | D-Mannitol* | 2.5 | 45 |
| | | 1 | 210 |
| | | 0.25 | 947 |
| Polymers | Polyvinylpyrrolidone* | 10 | −35 |
| | | 5 | 2 |
| | | 1 | 190 |
| | PEG nominal Mp 1.5k* | 10 | 211 |
| | | 5 | 356 |
| | | 1 | 724 |
| | PEG nominal Mp 4k* | 10 | 75 |
| | | 5 | 230 |
| | | 1 | 980 |
| | PEG nominal Mp 10k* | 10 | 40 |
| | | 5 | 86 |
| | | 1 | 1234 |
| | PEG nominal Mp 20k* | 10 | 300 |
| | | 5 | 464 |
| | | 1 | 1677 |
| | Tween ® 20* | 10 | 13 |
| | | 5 | 35 |
| | | 1 | 842 |
| | Tween ® 80* | 10 | 32 |
| | | 5 | 18 |
| | | 1 | 192 |
| Salt | Sodium Chloride* | 1.35 | 1451 |
| | | 0.9 | 4194 |
| | | 0.45 | 1709 |

*reference composition

Freeze-thaw challenge (−20° C.) of brPEI 25 kDa/mRNA N/P 10 formulations at 0.25 mg/mL mRNA concentration containing the indicated % (w/v) of additive. α-Lactose monohydrate and D-Mannitol were tested at reduced concentrations due to limited solubility in water. Sodium chloride was tested at reduced concentrations to remain within the isotonic concentration range. n=1.

TABLE 2 mRNA/polymer/1,2-propanediol weight ratios of the above experiment.

| 1,2-Propanediol % w/v | mRNA [mg] | Polymer [mg] | 1,2-Propanediol [mg] |
|---|---|---|---|
| 1 | 1 | 1.3 | 41.6 |
| 5 | 1 | 1.3 | 208.0 |
| 10 | 1 | 1.3 | 416.0 |

A size increase of more than 100% (100%≙doubled diameter) was defined as aggregation process. Additives resulting in a size difference below this threshold were selected to be tested in vitro for transfection efficiency on A549 cells after one freeze-thaw cycle (FIG. 1 and Table 3). Sugars were not tested in vitro.

FIG. 1 shows the transfection efficiency of brPEI/FLuc mRNA N/P 10 formulations containing additives on A549 cells.

TABLE 3

Tabulated data of FIG. 1.

| | Additive | | Dose [µg mRNA/well] | | |
|---|---|---|---|---|---|
| | Type | Conc. [% w/v] | 0.125 | 0.25 | 0.5 |
| | | | | RLU [cps] | |
| brPEI 25 kDa/Fluc, N/P10 | fresh complex* | 0 | 11 ± 0.5 | 76 ± 29.5 | 698 ± 364.5 |
| | Polysorbat-80* | 5 | 10 ± 2.5 | 85 ± 16.5 | 875 ± 405.5 |
| | Polyvinylpyrolidone* | 5 | 14 ± 1.5 | 60 ± 24.0 | 336 ± 121.0 |
| | PEG nominal Mp 4k* | 10 | 17 ± 1.0 | 58 ± 5.5 | 365 ± 69.5 |
| | (2-Hydroxypropyl)-β-cyclo-dextrin* | 5 | 11 ± 3.5 | 44 ± 9.5 | 332 ± 12.5 |
| | Glycerol* | 5 | 17 ± 2.0 | 31 ± 6.0 | 204 ± 64.0 |
| | PEG nominal Mp 10k* | 10 | 9 ± 3.0 | 19 ± 8.0 | 205 ± 33.0 |
| | D-Mannitol* | 5 | 20 ± 7.5 | 22 ± 9.0 | 179 ± 5.5 |
| | 1,2-Propanediol | 5 | 8 ± 6.5 | 15 ± 3.5 | 176 ± 3.5 |

*reference composition

From the tabulated data, it can be seen that all additives retained the transfection efficiency and were thus selected to be tested by nebulization to mice. 8 mL complex solution containing 2 mg mRNA encoding for firefly luciferase were nebulized to a group of BALB/c mice (n=3). 24 h after treatment mice were euthanized. The efficiency of mRNA delivery was analyzed via quantification of luciferase activity in the excised organ (by Ivis) as well as in the organ homogenate (see FIG. 2 and Table 4). The employed mRNA/polymer/1,2-propanediol weight ratios are reported in Table 5.

FIG. 2 shows the in vivo transfection efficiency of brPEI/mRNA formulations applied via nebulization after one freeze-thaw cycle.

2 mg FLuc mRNA complexed with brPEI 25 kDa at N/P 10 and 0.25 mg/mL were nebulized to mice after one freeze-thaw cycle in the presence of the indicated additives. For reference, one group was treated with freshly prepared particles without addition of additives. High viscosity of formulations containing 10% PEG4k or PEG10k prevented nebulisation by the Aeroneb nebulizer. n=3.

TABLE 4

Tabulated data of FIG. 2 including bioluminescence data.

| Additive | | Bioluminescence (explanted lungs) | | Luciferase activity (homogenates) | |
|---|---|---|---|---|---|
| | Conc. | Total Flux | | | |
| Type | [% w/v] | [photos/sec] | STDEV | [RLU/organ] | STDEV |
| w/o (fresh complex)* | 0 | 113600 | 90026 | 11745 | 5284 |
| 1,2-Propanediol | 5 | 134100 | 65699 | 11168 | 5372 |
| (2-Hydroxypropyl)-β-cyclo-dextrin* | 5 | 20110 | 9911 | 2347 | 1292 |
| D-Mannitol* | 5 | 11760 | 4135 | 977 | 453 |
| Poylsorbat-80* | 5 | 16117 | 11444 | 1075 | 919 |
| Glycerol* | 5 | 7610 | 624 | 719 | 80 |
| Polyvinylpyrolidone* | 5 | 7463 | 2292 | 369 | 180 |
| PEG nominal Mp 4k* | 10 | not nebulizable | | | |
| PEG nominal Mp 10k* | 10 | not nebulizable | | | |
| Trehalose* | 5 | 10140 | 3675 | 978 | 172 |
| Sucrose* | 5 | 8922 | 838 | 716 | 78 |
| Lactose* | 5 | 5792 | 1770 | 338 | 46 |

*reference composition

TABLE 5 mRNA/polymer/1,2-propanediol weight ratios of the above experiment.

| 1,2-Propanediol % w/v | mRNA [mg] | Polymer [mg] | 1,2-Propanediol [mg] |
|---|---|---|---|
| 5 | 1 | 1.3 | 208.0 |

Discussion and Conclusion 1,2-Propanediol (propylene glycol, PG) has been identified as additive that prevents particle aggregation and maintains the transfection efficiency of formulations after nebulization in vivo following one freeze-thaw cycle compared to freshly formulated brPEI/mRNA nano- or microparticles.

Example II: Comparison of Different Additives Structurally Related to 1,2-Propanediol as Cryoprotectants for Nano- or Microparticles Complex Formation Complexes of branched poly(ethylenimine) (brPEI) and mRNA encoding for luciferase were formed at a final concentration of 0.25 mg/mL. In a standard mixing process, mRNA was diluted with water to a concentration of 0.5 mg/mL. The same volume of brPEI solution was prepared at a concentration of 0.65 mg/mL in water. Nanoparticles were formed by injection of the mRNA solution into the brPEI solution followed by mixing using an electronic pipette (Mettler-Toledo, E4 LTS 1000 μL). After mixing, the complexes were incubated for 20 min on ice before use.

Size Measurement

For the determination of the particle diameter, 100 μL of a suspension of the particles was filled into a cuvette (Brand, UV-cuvette Micro) and measured using a Malvern ZetaSizer Nano ZS (Malvern Instruments) giving the hydrodynamic diameters and the average hydrodynamic diameter (z-average) in nm. As a suspension medium, water or water containing a cryoprotective additive, as indicated, was used.

Freeze-Thaw Challenge

The formulation was diluted 1:2 with 2× (20/10/2%) additive solutions (Table 6) and split in duplicates. As solubility of some additives was limited, the following substances were tested at reduced concentrations (see Table 6): 2-methyl-1,4-butanediol, pentaerythritol. One sample of each resulting formulation was used for size determination (Malvern Zetasizer NanoZS) in presents of additive. The remaining samples were frozen at −20° C. for 16 h, thawed at RT and immediately stored on ice before the solutions reached RT. One sample of each thawed formulation was then used for size determination (Malvern Zetasizer NanoZS) and compared regarding the % size deviation of formulations before freezing and after thawing according to the following equation, wherein $d_h$ indicates the z-average particle diameter:

$$\text{size deviation}[\%] = \left(\frac{d_h(\text{after freezing})}{d_h(\text{before freezing})} - 1\right) * 100\%$$

Sample Preparation for In Vivo Experiments

Complexes were prepared as described under "complex formation" and "freeze-thaw challenge" with the following modification. 4 mL of complex solution was prepared at a concentration of 0.5 mg/mL and diluted 1:2 with a double concentrated additive solution to result in a final mRNA concentration of 0.25 mg/mL (8 mL). Samples were kept frozen until nebulization to animals.

Nebulization

Animals were placed in a Buxco Small Size Mass Dosing Chamber (Data Sciences International, Germany). The formulations were thawed at RT, placed on crushed ice before reaching RT and then nebulized using an Aeroneb Solo Nebulizer (Aeroneb, Germany) at an air circulation rate 3 L/min and a duty cycle of 100%.

Bioluminescence Measurement in Explanted Lungs 24 h after application, animals were set under full anesthesia through intraperitoneal injection of Fentanyl/Midazolam/Medetomidin (0.05/5.0/0.5 mg/kg BW). 50 μL D-Luciferin (30 mg/mL dissolved in phosphate buffered saline, pH 7) were applied via the sniffing route (inhalation of solution after it was directly applied to the nostrils) and 100 μL D-Luciferin were applied systemically by intraperitoneal injection. At 10 min post Luciferin administration, mice were euthanized via cervical dislocation. After perfusion with PBS via the right heart lungs were explanted. Bioluminescence was measured using a Xenogen IVIS Luminar XR (Caliper LifeSciences) with a binning Set to 8 and an exposure time of 5 min. Bioluminescence was quantified and analyzed using Living Image Software 4.4 (Xenogen). In case of oversaturated pictures (detection of expression out of linear range), exposure time was reduced to 1 min. Bioluminescence was measured as Total flux per organ (in photons/sec). Only pictures without oversaturation were used for analysis. Lungs were snap frozen and stored at −80° C.

Luciferase Activity in Homogenized Lungs

Organs were weighed and one half of explanted lungs was homogenized in lysis buffer using a FastPrep®-24 Homogenisator (MP Biomedicals). 100 µL luciferin buffer was added automatically by the Lumat LB 9507 Luminometer (Berthold Technologies) to 75 µL of centrifuged lysates. Luciferase activity was measured in RLU/s and converted to RLU/organ.

Results

Example I shows that 1,2-propanediol prevents nano- or microparticle aggregation during freezing while maintaining activity in vivo whereas glycerol (a molecule with chemical similarity) prevents aggregation during freezing without maintaining activity in vivo. The results of this test show that C3-C5 alkanols and alkanediols structurally related to 1,2-propanediol are able to prevent aggregation during one freeze-thaw challenge and to maintain transfection efficiency after subsequent nebulization. Complexes were formed and mixed with the additive solutions (in water) to result in the final additive concentrations listed in Table 6.

The hydrodynamic diameter of particles was measured before freezing at −20° C. After 16 h, all formulations were thawed and particle size measured again. The % size deviation before freezing versus after thawing are displayed in Table 6b. High numbers indicate a large increase in size and thus aggregation.

TABLE 6a

Standard size of a freshly prepared complex in water. Triplicate measurement with the ZetaSizer Nano ZS (Malvern)

| Carrier | Hydrodynamic diameter (z-average [nm]) | Pdl |
|---|---|---|
| brPEI, N/P 10 | 70.94 | 0.204 |
|  | 66.30 | 0.193 |
|  | 65.40 | 0.191 |

TABLE 6b

% Size deviation before freezing versus after thawing of the tested additive concentrations.

| Formulation | Additive | Additive concentration [% w/v] | Size difference [%] |
|---|---|---|---|
| brPEI/mRNA N/P10 0.25 mg/mL | no* | 0 | 1115 |
|  |  | 0 | 1766 |
|  |  | 0 | 945 |
|  | 2-Propanol | 10 | 47 |
|  |  | 5 | 60 |
|  |  | 1 | 120 |
|  | 1,2-Propanediol | 10 | 1 |
|  |  | 5 | 7 |
|  |  | 1 | 38 |

TABLE 6b-continued

% Size deviation before freezing versus after thawing of the tested additive concentrations.

| Formulation | Additive | Additive concentration [% w/v] | Size difference [%] |
|---|---|---|---|
|  | 1,2-Butanediol | 10 | 0 |
|  |  | 5 | 11 |
|  |  | 1 | 50 |
|  | 1,3-Butanediol | 10 | 1 |
|  |  | 5 | 16 |
|  |  | 1 | 41 |
|  | 2-Methyl-1,4-butanediol | 1.25 | 33 |
|  |  | 0.625 | 77 |
|  |  | 0.125 | 1285 |
|  | 1,1,1-Tris(hydroxymethyl)ethane* | 10 | 510 |
|  |  | 5 | 353 |
|  |  | 1 | 690 |
|  | Pentaerythritol* | 5 | 316 |
|  |  | 2.5 | 323 |
|  |  | 0.5 | 609 |
|  | 1,1,1-Tris(hydroxymethyl)propane* | 10 | 1 |
|  |  | 5 | 13 |
|  |  | 1 | 41 |
|  | Tetraglycol* | 10 | 17 |
|  |  | 5 | 34 |
|  |  | 1 | 90 |
|  | Glycerol formal* | 10 | 13 |
|  |  | 5 | 17 |
|  |  | 1 | 67 |
|  | Triethylene glycol* | 10 | 3 |
|  |  | 5 | 20 |
|  |  | 1 | 32 |
|  | Glycerol* | 10 | 12 |
|  |  | 5 | 8 |
|  |  | 1 | 46 |

*reference examples

2-Methyl-1,4-butanediol and Pentaerythritol were tested at reduced concentrations due to limited solubility in water. n=1.

A change in particle size of more than 100% (100%=doubled diameter) was defined as an aggregation process. Additives resulting in a % size deviation below this threshold were selected to be tested by nebulization to mice (FIG. 3 and Table 7).

FIG. 3 shows the in vivo transfection efficiency of brPEI/mRNA formulations after one freeze-thaw cycle.

2 mg/8 mL FLuc mRNA complexed with brPEI 25 kDa at N/P 10 and 0.25 mg/mL were nebulized to mice after one freeze-thaw cycle in the presence of the indicated additives. 24 h post treatment mice were anesthetized, lungs explanted, homogenized and measured for luciferase activity. n=3.

TABLE 7

Tabulated data of FIG. 3 including bioluminescence data.

| Additive | | Bioluminescence (explanted lungs) | | Luciferase activity (homogenates) | |
|---|---|---|---|---|---|
| Type | Conc. [% w/v] | Total Flux [photos/sec] | STDEV | [RLU/organ] | STDEV |
| w/o (fresh complex)* | 0 | 113600 | 90026 | 11745 | 5284 |
| 1,2-Propanediol | 5 | 168833 | 87083 | 22457 | 9895 |
| 2-Propanol | 10 | 208173 | 93362 | 17680 | 3807 |
| 1,2-Butanediol | 5 | 77080 | 27417 | 9475 | 5724 |
| 1,3-Butanediol | 5 | 65000 | 39251 | 7508 | 2858 |
| 2-Methyl-1,4-butanediol | 0.625 | 58187 | 21887 | 5465 | 2697 |
| Glycerol formal* | 5 | 19097 | 14362 | 1137 | 1040 |
| Tetraglycol* | 5 | 10407 | 880 | 267 | 112 |
| 1,1,1-Tris(hydroxymethyl)propane* | 5 | 38467 | 30234 | 266 | 163 |
| Triethylene glycol* | 5 | 17833 | 3734 | 245 | 102 |

*reference examples

Discussion and Conclusion

Within this study, it could be demonstrated that alkanols/alkanediols structurally related to 1,2-propanediol have the ability to maintain the complex transfection efficiency after nebulization to murine lungs after one freeze-thaw cycle. The biophysical properties were analyzed first before freezing and after one freeze-thaw cycle as aggregation or disruption of particles lead to non-functional formulations. The findings from example I could be replicated as 1,2-propanediol and glycerol preserve particle size. As already demonstrated in the former study, preservation of particle size did not automatically result in functional particles after nebulization to mice.

Example III: Freezing Formulations at Varying mRNA Concentrations and/or Varying NIP Ratios Complex Formation Complexes of branched (polyethylenimine) (brPEI), P7 (linear(polyethylenimine-co-propylenimine), MW: 20 kDa) or P12 linear(polyethylenimine-co-propylenimine), MW: 24 kDa) with mRNA encoding for luciferase were formed at a concentration of 0.25 mg/mL. In a standard mixing process mRNA was diluted to a concentration of 0.5 mg/mL in water. The same volume of polymer solution was prepared at a concentration of 0.65 mg/mL in water. To formulate the nanoparticles the mRNA solution was injected into the brPEI solution followed by mixing using an electronic pipette (Mettler-Toledo, E4 LTS 1000 μL). After mixing the complexes were incubated for 20 min on ice before use.

Concentration of Formulations

Before use, the membrane of an Amicon® Ultra-15 centrifugal filter unit (Merck Millipore, PLHK Ultracel-PL membrane, 100 kDa molecular weight cut-off) was washed with 15 mL water (500×g). Then, the polyplex formulation was transferred to the filter unit and centrifuged at 500×g and 4° C. In an interval of 5 min, the fluid level was checked to avoid over-concentration and the solution was mixed thoroughly with a 1 mL pipette. At each interval, the sample concentration was monitored by spectrophotometric evaluation of the nucleic acid concentration ($A_{260}$). This process was repeated until the desired concentration was reached.

Size Measurement

For the determination of the particle diameter, 200 μL of a suspension of the particles was filled into a cuvette (Brand, UV-cuvette Micro) and measured using a Malvern ZetaSizer Nano ZS (Malvern Instruments) giving the hydrodynamic diameters and the average hydrodynamic diameter (z-average) in nm. As a suspension medium, water or water containing a cryoprotective additive, as indicated, was used.

Freeze-Thaw Challenge

After an initial determination of polyplex size (Malvern Zetasizer NanoZS), the formulation is distributed into 96-well low profile PCR plates (clear, RNAse and DNase free) and diluted 1:2 with 2× (20/10/2%) additive solutions (Table 1). One sample of each resulting formulation was used for size determination (Malvern Zetasizer NanoZS). The remaining samples were frozen at −20° C. for ~16 h, thawed at RT and immediately stored on ice before the solutions reach RT. One sample of each thawed formulation was then used for size determination (Malvern Zetasizer NanoZS) and compared regarding the % size deviation of formulations before freezing and after thawing according to the following equation, wherein $d_h$ indicates the z-average particle diameter:

$$\text{size deviation}[\%] = \left(\frac{d_h(\text{after freezing})}{d_h(\text{before freezing})} - 1\right) * 100\%$$

Results

The ability of the claimed class of the identified molecules to act as cryoprotectant for nano- or microparticles also at increased mRNA concentration and/or reduced N/P ratio could be shown in this experiment. For this purpose, 1,2-propanediol was chosen as representative additive. Table 8 shows the % particle size deviation before freezing versus after thawing of complexes frozen at different mRNA concentrations (0.25, 1.1 or 2.3 mg/mL) and different N/P ratios (N/P 4 or 10). The employed mRNA/polymer/1,2-propanediol weight ratios are reported in Table 9.

TABLE 8

% size deviation before freezing versus after thawing. n = 3.

| N/P ratio | mRNA conc. [mg/mL] | 1,2-Propanediol [% w/v] | |
|---|---|---|---|
| | | 10 | 5 |
| 4 | 0.25 | -2  -1  4 | 12  15  17 |
| 4 | 1.1 | 5  15  6 | 25  29  20 |
| 10 | 2.3 | 20  20  21 | 17  22  22 |

The data show that all tested conditions led to avoidance of aggregation using the additive.

TABLE 9 mRNA/polymer/1,2-propanediol weight ratios of the above experiment.

| N/P ratio | mRNA conc. [mg/mL] | 1,2-Propanediol wt % | mRNA [mg] | Polymer [mg] | 1,2-Propanediol [mg] |
|---|---|---|---|---|---|
| 4 | 0.25 | 10 | 1 | 0.52 | 416.00 |
| 4 | 0.25 | 5 | 1 | 0.52 | 208.00 |
| 4 | 1.1 | 10 | 1 | 0.52 | 94.55 |
| 4 | 1.1 | 5 | 1 | 0.52 | 47.27 |
| 10 | 2.3 | 10 | 1 | 1.30 | 45.22 |
| 10 | 2.3 | 5 | 1 | 1.30 | 22.61 |

Discussion and Conclusion

Example III demonstrates that particle size can be maintained independent of polymer to mRNA ratio as well as mRNA concentration during freezing.

Example IV: Cryoprotective Character of Identified Additives for Different Polycations (Addition Before Mixing)

Complex Formation

Complexes of cationic polymer and mRNA encoding for luciferase were formed using three different polymeric structures: branched poly(ethylenimine) (brPEI, 25 kDa), linear poly(ethylenimine-propylenimine) (P7, 20 kDa) or linear poly(ethylenimine-propylenimine) (P12, 24 kDa).

P7 and P12 are linear poly(ethylenimine-propylenimine) polymers of following structure:

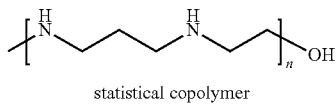

statistical copolymer

Synthesis:

A mixture of dry 2-ethyl-2-oxazoline and dry 2-ethyl-2-oxazine was combined with methyl triflate in acetonitrile. The polymerization was carried out for 30 h at 130° C. under nitrogen atmosphere. The polymerization was stopped by addition of water and incubation for 3 h at 130° C. The polymer was obtained by three precipitation steps in cold diethyl ether. For hydrolysis the polymer was dissolved in concentrated hydrochloric acid and incubated for 30 h at 130° C. The pH of the polymer solution was adjusted to pH 10 with NaOH. Purification was performed via dialysis against deionized water followed by lyophilization. Via modification of the 2-ethyl-2-oxazoline to 2-ethyl-2-oxazine ratio, the resulting ethylenimine (C2) to propylenimine (C3) ratio can be modified within the polymer. With the used amount of methyl triflate the molecular weight can be controlled.

The resulting polymers had the following properties:

| Polymer name | MW [g/mol] | C2:C3 ratio [mol:mol] |
|---|---|---|
| P7 | 28300 | 1:1 |
| P12 | 33400 | 1:1 |

Complexes were mixed at a final concentration of 0.25 mg/mL at the three different N/P ratios 4, 6 and 10. In a standard mixing process mRNA was diluted in water to a concentration of 0.5 mg/mL. The same volume of polymer solution was prepared (concentration see Table 10) in water containing 20% or 10% (w/v) 1,2-propanediol. Nanoparticles were formed by injection of the mRNA solution into the polymer solution followed by mixing using an electronic pipette (Mettler-Toledo, E4 LTS 1000 μL). After mixing, the complexes were incubated for 20 min on ice before use.

TABLE 10

Concentrations of polymer solutions for the preparation of complexes at different N/P ratios

| Polymer | Concentration of polymer solution for intended N/P ratio [mg/mL] | | |
|---|---|---|---|
| | 4 | 6 | 10 |
| brPEI | 0.26 | 0.39 | 0.65 |
| P7 | 0.29 | 0.43 | 0.72 |
| P12 | 0.29 | 0.43 | 0.72 |

Size Measurement

For the determination of the particle diameter, 100 μL of a suspension of the particles was filled into a cuvette (Brand, UV-cuvette Micro) and measured using a Malvern ZetaSizer Nano ZS (Malvern Instruments) giving the hydrodynamic diameters and the average hydrodynamic diameter (z-average) in nm. As a suspension medium, water or water containing a cryoprotective additive, as indicated, was used.

Freeze-Thaw Challenge

One sample of each resulting formulation was used for size determination (Malvern Zetasizer NanoZS). The remaining samples were frozen at −20° C. for 16 h, thawed at RT and immediately stored on ice before the solutions reached RT. One sample of each thawed formulation was then used for size determination (Malvern Zetasizer NanoZS) and compared regarding the % size deviation of formulations before freezing and after thawing according to the following equation:

$$\text{size deviation}[\%] = \left( \frac{d_h(\text{after freezing})}{d_h(\text{before freezing})} - 1 \right) * 100\%$$

Sample Preparation for In Vivo Experiments:

Complexes were prepared as described under "complex formation" and "freeze-thaw challenge" at N/P 4 at a volume of 8 mL. Samples were kept frozen until nebulization to animals Nebulization Animals were placed in a Buxco Small Size Mass Dosing Chamber (Data Sciences International, Germany). The formulations were thawed at RT, placed on crushed ice before reaching RT and then nebulized using an Aeroneb Solo Nebulizer (Aeroneb, Germany) at an air circulation rate 3 L/min and a duty cycle of 100%.

Bioluminescence Measurement in Explanted Lungs 24 h after application, animals were set under full anesthesia through intraperitoneal injection of Fentanyl/Midazolam/Medetomidin (0.05/5.0/0.5 mg/kg BW). 50 µL D-Luciferin (30 mg/mL dissolved in phosphate buffered saline, pH 7) were applied via the sniffing route (inhalation of solution after it was directly applied to the nostrils) and 100 µL D-Luciferin were applied systemically by intraperitoneal injection. At 10 min post Luciferin administration, mice were euthanized via cervical dislocation. After perfusion with PBS via the right heart lungs were explanted. Bioluminescence was measured using a Xenogen IVIS Luminar XR (Caliper LifeSciences) with a binning Set to 8 and an exposure time of 5 min. Bioluminescence was quantified and analyzed using Living Image Software 4.4 (Xenogen). In case of oversaturated pictures (detection of expression out of linear range), exposure time was reduced to 1 min. Bioluminescence was measured as Total flux per organ (in photons/sec). Only pictures without oversaturation were used for analysis. Lungs were snap frozen and stored at $-80°$ C.

Luciferase Activity in Homogenized Lungs

Organs were weight and one half of explanted lungs were homogenized in lysis buffer using a FastPrep®-24 Homogenisator (MP Biomedicals). 100 µL luciferin buffer was added automatically by the Lumat LB 9507 Luminometer (Berthold Technologies) to 75 µL of centrifuged lysates. Luciferase activity was measured in RLU/s and converted to RLU/organ.

Results

Examples I-III demonstrate efficiency of the additives in prevention of aggregation while maintaining efficiency in vivo at different condition solely with particles formed with branched poly(ethylenimine). To demonstrate that the functionality of these additives is independent of the polymer characteristics, different types of polymers were tested. 1,2-Propanediol was chosen as an exemplary additive. Polymers were varied in branching type (branched and linear), molecular weight (20 kDa, 24 kDa and 25 kDa), monomer composition (poly(ethylenimine) and poly(ethyleniminepropylenimine)) as well as N/P ratio (4, 6 and 10). Chosen polymers already have proven functionality after nebulization. Results of the % size deviation of particles before freezing and after thawing for two different additive concentrations are shown as size deviation in Table 10. The N/P ratio (N/P 4) was also tested for functionality in vivo. A summary of efficiency data is given in FIG. 4 as well as Table 13. The employed mRNA/polymer/1,2-propanediol weight ratios are reported in Table 12 and Table 14b.

TABLE 12 mRNA/polymer/1,2-propanediol weight ratios of the above experiment.

| Polymer | N/P ratio | 1,2-Propanediol % w/v | mRNA [mg] | Polymer [mg] | 1,2-Propanediol [mg] |
|---|---|---|---|---|---|
| brPEI 25 kDa | 4 | 5% | 1 | 0.52 | 208 |
| brPEI 25 kDa | 6 | 5% | 1 | 0.78 | 208 |
| brPEI 25 kDa | 10 | 5% | 1 | 1.30 | 208 |
| brPEI 25 kDa | 4 | 10% | 1 | 0.52 | 416 |
| brPEI 25 kDa | 6 | 10% | 1 | 0.78 | 416 |
| brPEI 25 kDa | 10 | 10% | 1 | 1.30 | 416 |
| P7 | 4 | 5% | 1 | 0.58 | 208 |
| P7 | 6 | 5% | 1 | 0.87 | 208 |
| P7 | 10 | 5% | 1 | 1.44 | 208 |
| P7 | 4 | 10% | 1 | 0.58 | 416 |
| P7 | 6 | 10% | 1 | 0.87 | 416 |
| P7 | 10 | 10% | 1 | 1.44 | 416 |
| P12 | 4 | 5% | 1 | 0.58 | 208 |
| P12 | 6 | 5% | 1 | 0.87 | 208 |
| P12 | 10 | 5% | 1 | 1.45 | 208 |
| P12 | 4 | 10% | 1 | 0.58 | 416 |
| P12 | 6 | 10% | 1 | 0.87 | 416 |
| P12 | 10 | 10% | 1 | 1.45 | 416 |

FIG. 4 shows the in vivo transfection efficiency of concentrated polymer/mRNA formulations.

2 mg mRNA coding for firefly luciferase complexed with brPEI 25 kDa/P7/P12 at N/P 4 were nebulized to mice after either fresh preparation (0.25 mg/mL mRNA; 8 mL/group) or one freeze-thaw cycle (1 mg/mL mRNA; 2 mL/group) in the presence of the indicated additives. 24 h post treatment mice were anesthetized and lungs explanted. The luciferase activity was measured in lung homogenates. n=3

TABLE 11

% Size deviation of complex formulations with different polymers containing 5% or 10% (w/v) 1,2-Propanediol before freezing versus after thawing.

| mRNA concentration [mg/mL] | Polymer | MWt [kDa] | type | 5% 1,2-Propanediol | | | 10% 1,2-Propanediol | | |
|---|---|---|---|---|---|---|---|---|---|
| | | | | N/P 4 | N/P 6 | N/P 10 | N/P 4 | N/P 6 | N/P 10 |
| 0.25 | brPEI | 25 | branched | 27 | −22 | 8 | 12 | 7 | 1 |
| | P7 | 20 | linear | 31 | 23 | 37 | 9 | 3 | 7 |
| | P12 | 24 | linear | 12 | 0 | 48 | 48 | 4 | 2 |

TABLE 13

Tabulated data of FIG. 4.

| Fluc mRNA dose/group | Polymer | mRNA conc. [mg/mL] | Additive Type | Conc. [% w/v] | Bioluminescence (explanted lungs) Total Flux [photos/sec] | STDEV | Luciferase activity (homogenates) [RLU/organ] | STDEV |
|---|---|---|---|---|---|---|---|---|
| 2 mg | brPEI | 0.25 | fresh complex | 0 | 64467 | 6809 | 2920 | 1108 |
|  | P7 | 0.25 |  | 0 | 286000 | 171128 | 27721 | 17186 |
|  | P12 | 0.25 |  | 0 | 202733 | 98217 | 24633 | 13277 |
|  | brPEI | 1 | 1,2-Propanediol | 5 | 45500 | 24307 | 3152 | 2717 |
|  | P7 | 1 |  | 5 | 589667 | 274906 | 31606 | 10180 |
|  | P12 | 1 |  | 5 | 537667 | 367406 | 34458 | 21217 |
|  | brPEI | 1 |  | 10 | 45967 | 7565 | 3303 | 1548 |
|  | P7 | 1 |  | 10 | 243000 | 156506 | 17646 | 12823 |
|  | P12 | 1 |  | 10 | 289000 | 205691 | 31692 | 30625 |

TABLE 14a

Standard size of a freshly prepared complex measured with the ZetaSizer (Malvern)

| Carrier | Hydrodynamic diameter (z-average [nm]) | PdI |
|---|---|---|
| brPEI, N/P 4 | 158.7 | 0.180 |
| P7, N/P 4 | 161.1 | 0.171 |
| P12, N/P 4 | 163.5 | 0.177 |

TABLE 14b mRNA/polymer/1,2-propanediol weight ratios of the above experiment.

| Polymer | N/P ratio | 1,2-Propanediol % w/v | mRNA [mg] | Polymer [mg] | 1,2-Propanediol [mg] |
|---|---|---|---|---|---|
| brPEI 25 kDa | 4 | 5% | 1 | 0.52 | 208 |
| brPEI 25 kDa | 4 | 10% | 1 | 0.52 | 416 |
| P7 | 4 | 5% | 1 | 0.58 | 208 |
| P7 | 4 | 10% | 1 | 0.58 | 416 |
| P12 | 4 | 5% | 1 | 0.58 | 208 |
| P12 | 4 | 10% | 1 | 0.58 | 416 |

Discussion and Conclusion

As shown in this experiment, the stabilizing effect of 1,2-propanediol is independent of polymer branching type, molecular weight, monomer composition as well as N/P ratio. Variation of all these parameters resulted in intact complexes after one freeze thaw challenge. Additionally, the functionality of these complexes after pulmonary application could be demonstrated in in vivo experiments. No significant difference of fresh complexes compared to same complexes frozen in 5% or 10% 1,2-propanediol regarding expression levels of reporter protein could be detected. The general differences of the efficiency of branched poly(ethylenimine) versus poly(ethylenimine-propylenimine) is in full agreement with the statement of WO2013182683A1. Additionally, this experiment confirmed that the time point of additive addition has no influence on its functionality. While additives were added to the nanoparticles after complexation in experiment I and II, in this experiment 1,2-propanediol was added to the polymer solution before it was mixed with the mRNA solution.

Example V: Stability of Frozen Complexes

Complex Formation

Complexes of branched(polyethylenimine) (brPEI) and mRNA encoding for luciferase were formed at a concentration of 0.25 mg/ml. In a standard mixing process mRNA was diluted in water to a concentration of 0.5 mg/mL. The same volume of brPEI solution was prepared at a concentration of 0.65 mg/mL either water or 10% 1,2-propanediol. To formulate the nanoparticles the mRNA solution was injected into the brPEI solution followed by mixing using an electronic pipette (Mettler-Toledo, E4 LTS 1000 µL). After mixing the complexes were incubated for 20 min on ice before use.

Freeze-Thaw Challenge

After an initial determination of polyplex size (Malvern Zetasizer NanoZS), 100 µL triplicates of each formulation were stored frozen at −20° C. for the indicated time, thawed at RT and immediately stored on ice before the solutions reached RT. One sample of each thawed formulation was then used for size determination (Malvern Zetasizer NanoZS) and compared regarding the % size deviation of formulations before freezing and after thawing according to the following equation, wherein $d_h$ indicates the z-average particle diameter:

$$\text{size deviation}[\%] = \left( \frac{d_h(\text{after freezing})}{d_h(\text{before freezing})} - 1 \right) * 100\%$$

mRNA Integrity Measurement

Nanoparticle formulations were diluted in water to 0.2 mg/mL mRNA. 5 µL of this dilution were treated with 3 µL 40 mg/mL Heparin, 2 µL 2% v/v Triton X-100 and 10 µL Formamide. The mixture was incubated for 15 min at 70° C. for complete particle disruption and then kept on crushed ice. Nucleic acid fragment analysis was then conducted by capillary gelelectrophoresis (Advanced Analytical Fragment Analyzer, PROSize 2.0). The signal for full-length mRNA from treated formulations ($mRNA_{treated}$) was compared to that of fresh, uncomplexed mRNA ($mRNA_{ref}$) of the same Lot that was used for formulation as a reference and expressed as mRNA integrity [%] according to the following formula:

$$mRNA\ \text{integrity}[\%] = \left(\frac{mRNA_{treated}}{mRNA_{ref}}\right) * 100\%$$

Results

A critical parameter for mRNA based nano- or microparticles is the mRNA stability in the complex. As shown in Table 15, storing complexes at 25° C. results in rapid degradation of the complexed mRNA. In this experiment the influence of ability to freeze the complexes on the stability of the complexed RNA was tested. In the first set, complexes were formed with RNA and frozen after addition of 1,2-propandiol as an exemplary candidate of the group of good performing additives. The integrity of the mRNA (amount of full length mRNA) in the complex was tested before freezing and one week after storage at −20° C. Fresh, uncomplexed mRNA was measured and set to 100% as a reference. The results are summarized in Table 16.

In a second set the experiment was repeated after storing the complexes for eight weeks at −20° C. Results are depicted in Table 17.

TABLE 15

Integrity of mRNA in complexes at RT.

| Polymer | mRNA integrity [%] | | |
|---|---|---|---|
| | 0 h | 1.5 h | 3 h |
| brPEI | 100 | 77.5 | 56.4 |

TABLE 16

Integrity of mRNA in frozen complexes (5% 1,2-propanediol, −20° C., 1 week) versus freshly prepared polyplexes or fresh mRNA.

| Sample | mRNA integrity [%] |
|---|---|
| fresh mRNA | 100 |
| fresh polyplex | 98 |
| 1-week FT polyplex (triplicate) | 94.7 ± 0.7 |

TABLE 17

Integrity of mRNA in frozen complexes (5% 1,2-propanediol, −20° C., 8 weeks) versus fresh mRNA.

| Sample | mRNA integrity [%] |
|---|---|
| fresh mRNA | 100 |
| 8-week FT polyplex (triplicate) | 98.9 ± 7.5 |

Discussion and Conclusion

The described experiments show the strong benefit of the ability to freeze nano- or microparticles for long term storage. While complexes stored at room temperature lead to a degradation process of the mRNA within hours, complexes stored in a frozen state results in fully preserved mRNA for at least eight weeks.

Example VI: 1,2-Propanediol as Cryoprotectant for Lipid-Based Formulations

Complex Formation

Lipid components (cationic lipidoid, helper lipid cholesterol and PEG-lipid) were solubilized and mixed in isopropanol and injected at a volumetric ratio of 1:4 into an mRNA solution in citrate buffer (10 mM citric acid, 150 mM NaCl, pH 4.5) resulting in an mRNA concentration of 0.2 mg/mL. Complexes were incubated for 20 min at RT. After incubation the solution was dialyzed against water for 16 h. The mRNA concentration after dialysis was 0.13 mg/mL. To reach an mRNA concentration of 0.2 or 0.5 mg/mL the particles were concentrated in a SpeedVac (Concentrator Plus, Eppendorf) at 45° C.

Size Measurement

For the determination of the particle diameter, 200 μL of a suspension of the particles was filled into a cuvette (Brand, UV-cuvette Micro) and measured using a Malvern ZetaSizer Nano ZS (Malvern Instruments) giving the hydrodynamic diameters and the average hydrodynamic diameter (z-average) in nm. As a suspension medium, water or water containing a cryoprotective additive, as indicated, was used.

Freeze-Thaw Challenge

The formulations were diluted 1:2 with 2× (20 or 10%) 1,2-propandiol solutions and split in different samples. One sample of each resulting formulation was used for size determination (Malvern Zetasizer NanoZS) in presents of additive. The remaining samples were frozen at −20° C. for 16 h, thawed at RT and immediately stored on ice before the solutions reached RT. One sample of each thawed formulation was then used for size determination (Malvern Zetasizer NanoZS) and compared regarding the % size deviation of formulations before freezing and after thawing according to the following equation, wherein $d_h$ indicates the z-average particle diameter:

$$\text{size deviation}[\%] = \left(\frac{d_h(\text{after freezing})}{d_h(\text{before freezing})} - 1\right) * 100\%$$

Intratracheal Spray Application

50 μL complex solution were applied intratracheally using a MicroSprayer 1A device (PennCentury, USA) under Isofluran inhalation anesthesia.

Bioluminescence Measurement in Explanted Lungs 24 h after application, animals were set under full anesthesia through intraperitoneal injection of Fentanyl/Midazolam/Medetomidin (0.05/5.0/0.5 mg/kg BW). 50 μL D-Luciferin (30 mg/mL dissolved in phosphate buffered saline, pH 7) were applied via the sniffing route (inhalation of solution after it was directly applied to the nostrils) and 100 μL D-Luciferin were applied systemically by intraperitoneal injection. At 10 min post Luciferin administration, mice were euthanized via cervical dislocation. After perfusion with PBS via the right heart lungs were explanted. Bioluminescence was measured using a Xenogen IVIS Luminar XR (Caliper LifeSciences) with a binning Set to 8 and an exposure time of 5 min. Bioluminescence was quantified and analyzed using Living Image Software 4.4 (Xenogen). In case of oversaturated pictures (detection of expression out of linear range), exposure time was reduced to 1 min. Bioluminescence was measured as total flux per organ (in photons/sec). Only pictures without oversaturation were used for analysis. Lungs were snap frozen and stored at −80° C.

Luciferase Activity in Homogenized Lungs

Thawed organs were weight and one-half of explanted lungs was homogenized in lysis buffer using a FastPrep®-24 Homogenisator (MP Biomedicals). 100 μL luciferin buffer was added automatically by the Lumat LB 9507 Luminometer (Berthold Technologies) to 75 μL of centrifuged lysates. Luciferase activity was measured in RLU/s and converted to RLU/organ.

intratracheally to mice via microspray after either storage at 4° C. or one freeze-thaw cycle. 24 h post treatment mice were anesthetized and lungs explanted for measurement of luciferase activity. n=3.

TABLE 19

Tabulated data of FIG. 5 (including bioluminescence in explanted lungs)

| FLuc mRNA dose/animal | Additive Type | Conc. [% w/v] | Comment | Bioluminescence (explanted lungs) Total Flux (photos/sec) | STDEV | Luciferase activity (homogenates) RLU/organ | STDEV |
|---|---|---|---|---|---|---|---|
| 10 μg | fresh complex | 0 | fresh | 8106000 | 1824000 | 2263125 | 98203 |
| | 1,2-Propanediol | 5 | fresh | 18522000 | 15191171 | 976173 | 256302 |
| | 1,2-Propanediol | 5 | frozen | 21634667 | 21475152 | 6637646 | 4472781 |

Results

This example demonstrated the suitability of the additives defined herein as cryoprotectants for lipid based complexes. In a first step, nanoparticles were formed and challenged with one freeze-thaw cycle in presents or absence of additives, Size was measured before freezing and after thawing. 1,2-propanediol was chosen as representative of the group of substances. The experiment was performed at different complex concentrations (0.2 and 0.5 mg/mL) as well as at different additive concentrations (5% and 10% (w/v)). The size difference is summarized in Table 18b.

TABLE 18a

Standard size of a freshly prepared complex measured with the ZetaSizer Nano ZS (Malvern)

| Carrier | Hydrodynamic diameter (z-average [nm]) | Pdl |
|---|---|---|
| LNP | 46.39 | 0.075 |
| | 45.73 | 0.071 |
| | 45.57 | 0.099 |

TABLE 18b

Size deviation in % of different polyplex formulations containing 5% or 10% 1,2-Propanediol before freezing versus after thawing.

| | Complex conc. [mg mRNA/mL] | |
|---|---|---|
| Additive | 0.2 | 0.5 |
| w/o | 254 | n/a |
| 5% 1,2-Propanediol | 16 | 24 |
| 10% 1,2-Propanediol | 9 | 16 |

As shown in Table 18b, 1,2-propanediol stabilizes the particle size during one freeze-thaw challenge also for lipid based complexes. Thus, the efficiency in transfection after pulmonary delivery was tested in a next step. For this purpose a dose of 10 μg mRNA encoding for firefly luciferase was applied to BALB/c mice via microspray injection into the trachea. Results of the detection of the produced protein as measure for the delivery efficiency and thus functionality of the carrier are shown in FIG. 5 and Table 19.

FIG. 5 shows the in vivo transfection efficiency of lipid-based nano- or microparticles particles after freezing with 1,2-propanediol.

Complexes containing mRNA coding for firefly luciferase were prepared with or without 1,2-propanediol and applied As can be seen in FIG. 5 and Table 19, complexes frozen in the presence of 1,2-propanediol maintained full functionality after in vivo application. Thus, the additive has no negative influence on the transfection efficiency.

Discussion and Conclusion

The data presented in this example show that 1,2-propanediol not only allows freezing of polymer based complexes but also of lipid-based complexes preventing them from aggregation and preserving activity in vivo.

Figure 1:
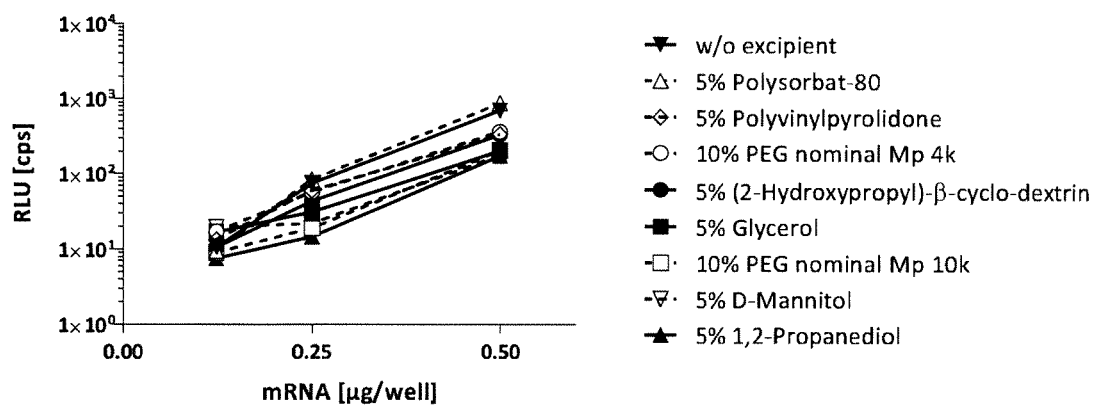
FIG. 1: Transfection efficiency of brPEI/FLuc mRNA N/P 10 formulations containing additives on A549 cells
Figure 2:
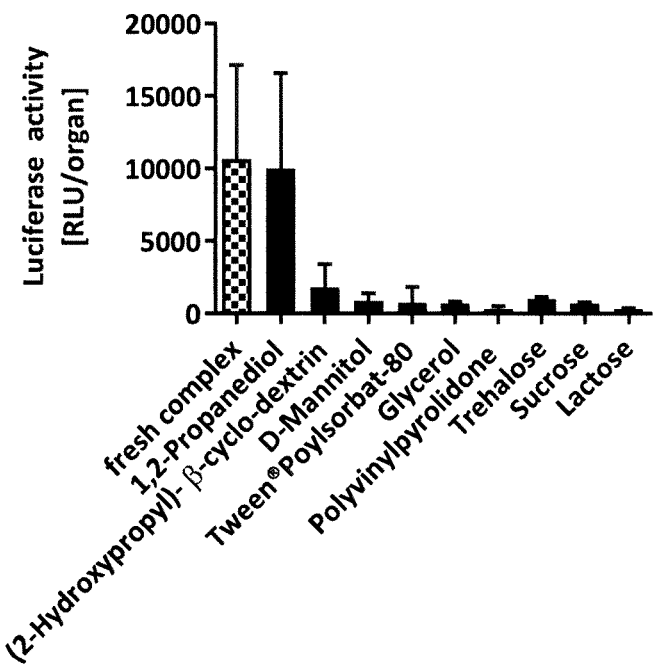
FIG. 2: In vivo transfection efficiency of brPEI/mRNA formulations after one freeze-thaw cycle
Figure 3:
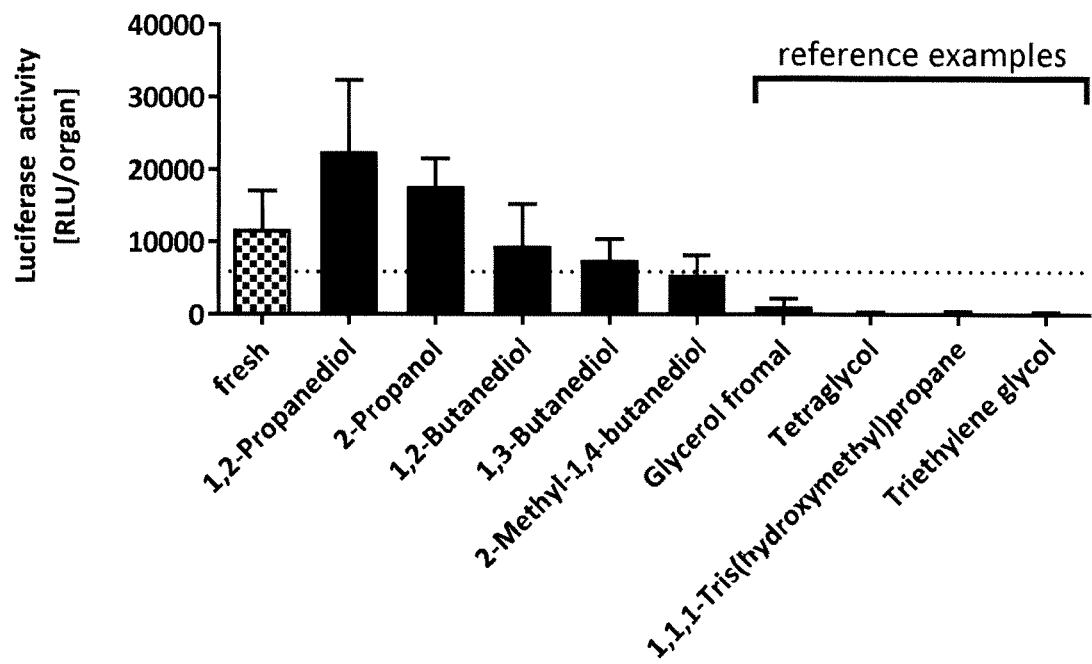
FIG. 3: In vivo transfection efficiency of brPEI/mRNA formulations after one freeze-thaw cycle. Dotted line: 50% of activity of fresh particle.
Figure 4:
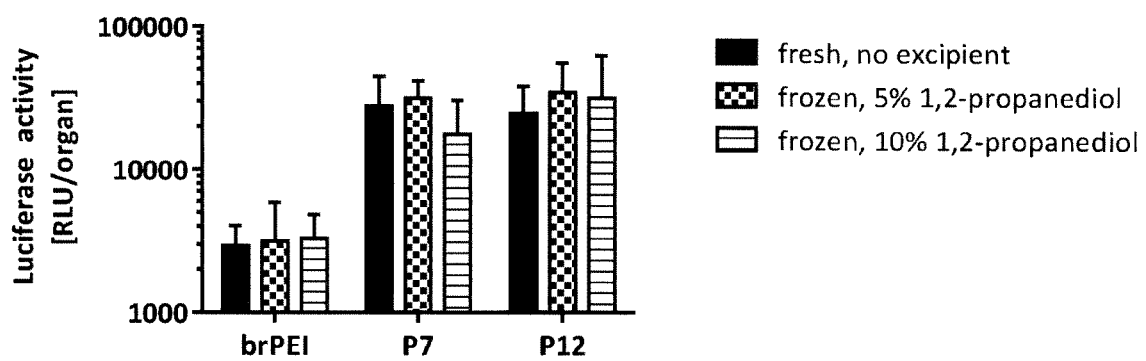
FIG. 4: In vivo transfection efficiency of concentrated polymer/mRNA formulations
Figure 5:
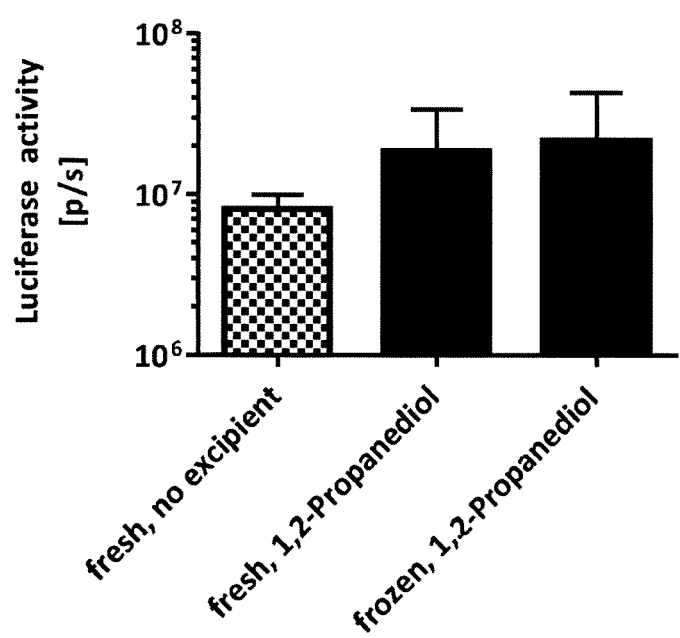
FIG. 5: In vivo transfection efficiency of lipid-based nano- or microparticles after freezing in 1,2-propanediol

The invention claimed is:

1. A device for forming an aerosol from a particulate composition suspended in a liquid or for nebulizing such a composition, which device comprises a suspension composition comprising:
   (i) a nano- or microparticle formulation comprising particles comprising a therapeutically active agent complexed to a cationic excipient suspended in a liquid phase, and
   (ii) at least one cryoprotective additive selected from C3-C5 alkanes substituted by one or two hydroxy groups, wherein the cryoprotective additive is contained in the suspension composition at a concentration of 0.5 to 50% w/v, based on the volume of the liquid phase,
   wherein the therapeutically active agent is a mRNA, wherein the suspension composition has been subjected to a freeze-thaw cycle, wherein the suspension composition was retained in a solid, frozen state for 16 hours to two years prior to thawing, and wherein the suspension composition retains its functionality during application to or via the respiratory tract after the freeze-thaw cycle.

2. The device in accordance with claim 1, wherein the device is an inhaler selected from a metered dose inhaler, a nebulizer, and a nasal spraying device.

3. The device according to claim 1, wherein the mRNA is modified.

4. The device according to claim 1, wherein the liquid phase comprises water and the cryoprotective additive, and wherein the water and the cryoprotective additive are the only solvents contained in the liquid phase.

5. The device according to claim 1, wherein the particles of the nano- or microparticle formulation have an average particle diameter in the range of 2 to 2500 nm.

6. The device according to claim 1, wherein the particles of the nano- or microparticle formulation have an average particle diameter in the range of 5 to 1000 nm.

7. The device according to claim 1, wherein the cationic excipient is a cationic lipidoid or cationic lipid.

8. The device according to claim 1, wherein the cationic excipient is a cationic oligomer or a cationic polymer.

9. The device according to claim 1, wherein the particles further comprise one or more helper lipids selected from the group consisting of sterols, neutral lipids, sphingolipids and pegylated lipids.

10. The device according to 1, wherein the cryoprotective additive comprises at least a secondary hydroxy group.

11. The device according to claim 10, wherein the cryoprotective additive is selected from the group consisting of 1,2-propanediol, 2-propanol, 1,2-butanediol, and 1,3-butanediol.

12. The device of claim 10, wherein the cryoprotective additive is 1,2-propanediol.

13. The device according to claim 1, wherein the cryoprotective additive is contained in the suspension composition at a concentration of 0.5 to 30% w/v, based on the volume of the liquid phase.

14. An aerosol which is obtained from the device in accordance with claim 1.

15. The device according to claim 1, wherein the particle formulation further comprises one or more poloxamers.

16. The device according to claim 1, wherein the particle formulation further comprises one or more additives selected from the group consisting of RNAse inhibitors, cell penetrating peptides, signal peptides, endosomolytic agents, targeting ligands, poloxamines, shielding oligomers, shielding polymers, polyanions, lipids, and polycations, wherein the polycations do not comprise branched poly(ethylenimine) or linear poly(ethylenimine-propylenimine).

17. The device according to claim 1, wherein the particle formulation further comprises one or more additives selected from the group consisting of magnetic nanoparticles, non-magnetic nanoparticles, fluorescent dyes, radioisotopes, and contrast agents.

18. The device according to claim 1, wherein the suspension composition was retained in a solid, frozen state for one week to two years prior to thawing.

19. A device for forming an aerosol from a particulate composition suspended in an aqueous liquid or for nebulizing such a composition, which device comprises a suspension composition comprising:

(i) a nano- or microparticle formulation comprising particles comprising a therapeutically active agent complexed to a cationic excipient suspended in an aqueous liquid phase, and (ii) at least one cryoprotective additive selected from 1,2-propanediol, 2-propanol, 1,2-butanediol, and 1,3-butanediol, wherein the cryoprotective additive is contained in the suspension composition at a concentration of 0.5 to 50% w/v, based on the volume of the aqueous liquid phase, wherein the therapeutically active agent is a mRNA, wherein the suspension composition has been subjected to a freeze-thaw cycle, wherein the suspension composition was retained in a solid, frozen state for at least 8 weeks prior to thawing, and wherein the suspension composition retains its functionality during application to or via the respiratory tract after the freeze-thaw cycle.

* * * * *